(12) United States Patent
Yamagami et al.

(10) Patent No.: US 7,475,409 B2
(45) Date of Patent: Jan. 6, 2009

(54) DISC CHANGER DEVICE

(75) Inventors: Shuichi Yamagami, Osaka (JP); Noboru Honjo, Osaka (JP)

(73) Assignee: Onkyo Corporation, Osaka (JP)

( * ) Notice: Subject to any disclaimer, the term of this patent is extended or adjusted under 35 U.S.C. 154(b) by 452 days.

(21) Appl. No.: 10/549,112

(22) PCT Filed: Mar. 22, 2004

(86) PCT No.: PCT/JP2004/003896

§ 371 (c)(1),
(2), (4) Date: Sep. 14, 2005

(87) PCT Pub. No.: WO2004/100146

PCT Pub. Date: Nov. 18, 2004

(65) Prior Publication Data

US 2006/0174253 A1  Aug. 3, 2006

(30) Foreign Application Priority Data

May 12, 2003  (JP) .............................. 2003-132707
May 12, 2003  (JP) .............................. 2003-132708

(51) Int. Cl.
*G11B 17/04* (2006.01)
(52) U.S. Cl. ..................................................... 720/619
(58) Field of Classification Search ................. 720/619; 360/98.04, 98.05, 98.06; 369/30.94, 30.8, 369/30.98

See application file for complete search history.

(56) References Cited

U.S. PATENT DOCUMENTS 5,173,889 A * 12/1992 Nagahisa et al. ......... 369/30.88

(Continued)

FOREIGN PATENT DOCUMENTS

JP        8-339606 A     12/1996

(Continued)

OTHER PUBLICATIONS

English Language Abstracts of JP 8-339606, JP 9-167423 and 2002-184080 International Search Report.

*Primary Examiner*—Tianjie Chen
(74) *Attorney, Agent, or Firm*—Michael Bednarek; Paul, Hastings, Janofsky & Walker LLP

(57) ABSTRACT

In a disc changer provided with a driving force transmission mechanism using a crank arm, the size of the crank arm is reduced as much as possible and the smooth movement of the tray is realized. The crank arm (7) is rotated by a driving force of a drive motor (5). The crank arm (7) has a distal end (71a) connected to a guide groove (100) formed at the tray (1). When the crank arm (7) rotates, the distal end (71a) moves along the guide groove (100). When the distal end moves through a left end curve (120) or a right end curve (130) at opposite ends of the guide groove (100), the rotational force of the crank arm (7) is transmitted to the tray (1), whereby the tray (1) performs open/close movement. The guide groove (100) has a bow shape made up of an arcuate intermediate curve (110), and the left end curve (120) and the right end curve (130) which are curved opposite to the intermediate curve (110), so that the force to be transmitted to the tray (1) changes continuously. Therefore, the smooth movement of the tray (1) and the size reduction of the crank arm (7) are possible.

16 Claims, 28 Drawing Sheets

U.S. PATENT DOCUMENTS 5,193,079 A * 3/1993 Ko et al. ............... 369/30.94
5,253,235 A * 10/1993 Isobe et al. ............ 417/149
5,742,571 A * 4/1998 Hoshino et al. ........ 369/30.98
5,777,957 A * 7/1998 Lyman .................. 369/30.94
5,867,459 A * 2/1999 Versleegers ............ 369/30.8
2003/0133371 A1 * 7/2003 Mabuchi ............... 369/30.93

FOREIGN PATENT DOCUMENTS

| JP | 9-167423 A | 6/1997 |
| JP | 2002-184080 | 6/2002 |

* cited by examiner

| SW96 | SW95 | SW94 |
|------|------|------|
| ON   | OFF  | OFF  |

| SW96 | SW95 | SW94 |
|------|------|------|
| ON   | ON   | OFF  |

DISC CHANGER DEVICE

TECHNICAL FIELD

The present invention relates to a disc changer which is capable of successively playing a plurality of discs.

BACKGROUND ART

A disc changer is known which is capable of carrying a plurality of discs such as CDs or DVDs mounted thereto and playing the discs successively.

An example of such disc changer includes a roulette table having a disc-like shape and formed, at the periphery, with plurality of mount portions to which a plurality of discs are to be mounted, a tray for rotatably supporting the roulette table and moving the periphery (formed with the mount portions) of the roulette table into and out of the main body of the changer, and a pick-up unit arranged at a predetermined position (hereinafter referred to as a "reading position") on a path along which the periphery of the roulette table rotates. With the tray accommodated in the main body, the roulette table is rotated, and the pick-up unit clamps the disc transported to the predetermined reading position to read the data recorded on the disc.

Further, a disc changer is known in which the driving source for the in/out operation of the tray and the clamping/releasing operation of the pick-up unit comprises a single electric motor and a driving force transmission mechanism for transmitting the driving force of the electric motor selectively to the pick-up unit and the tray. For example, JP-A 2002-184080 discloses a disc changer which includes a driving force transmission mechanism comprising a rack formed on the tray and extending in the back and forth direction, a pinion for meshing with the rack, a cylindrical cam having a circumferential surface part of which is formed with a guide groove inclining vertically and another part of which is formed with teeth, and two-stage gear unit consisting of a large-diameter gear for meshing with the pinion and a speed reduction gear and a small-diameter gear partially formed with teeth for meshing with the teeth of the cylindrical cam.

In the disc changer, the driving force of the electric motor is transmitted to the large-diameter gear via the speed reduction gear, and the rotational force of the large-diameter gear is converted, by the large-diameter gear, the pinion and the rack, into the force for straight movement in the back and forth direction and transmitted to the tray. Further, by the cylindrical cam and the small-diameter gear rotating along with the large-diameter gear, the rotational force of the small-diameter gear is converted into the force for straight movement in the up and down direction and transmitted to the pick-up unit.

FIGS. 29 and 30 show another known driving force transmission mechanism in which a crank arm 700, a guide groove 1100 formed at a lower surface of a tray 1000, and a cylindrical cam 800 transmit the driving force of a single electric motor 500 to the tray 1000 and to pick-up unit (not shown) while switching therebetween.

FIG. 29 shows the state in which the tray 1000 is accommodated in the disc changer, whereas FIG. 30 shows the state in which an end of the tray 1000 is pulled out of the disc changer.

It is to be noted that the electric motor 500 as the driving source, a speed reduction mechanism 600 for transmitting the driving force of the electric motor 500 to the crank arm 700, the crank arm 700 and the cylindrical cam 800 are arranged below the tray 1000, i.e. on the deeper side with respect to the sheet surface. However, for convenience of drawing of the figure, the electric motor 500, the speed reduction mechanism 600, the crank arm 700 and the cylindrical cam 800 are drawn with solid lines in FIGS. 29 and 30.

Though not illustrated in FIGS. 29 and 30, the pick-up unit in the form of a box is disposed in a recess formed at an upper left portion of the tray 1000. The pick-up unit has a surface facing the cylindrical cam 800 and provided with a lever projecting from the surface. The distal end of the lever is fitted in a cam groove (not shown) formed on the circumferential surface of the cylindrical cam 800 as to be inclined to the vertical (in the direction perpendicular to the sheet surface).

The driving force of the electric motor 500 is transmitted to the crank arm 700 by the speed reduction mechanism 600. When the crank arm 700 rotates by the driving force of the electric motor 500, the distal end 710a of the arm portion 710 moves along the guide groove 1100 formed at the lower surface of the tray 1000. The guide groove 1100 includes an arcuate, intermediate curve 1110 having a radius of curvature equal to the radius of gyration of the arm portion 710, and a left and a right straight ends 1120 and 1130 extending from opposite ends of the intermediate curve 1110.

When the distal end 710a of the arm portion 710 moves along the intermediate curve 1110 of the guide groove 1100, the rotational force of the crank arm 700 is not transmitted to the tray 1000 but transmitted only to the cylindrical cam 800 during when the cylindrical cam meshes with the crank arm 700. When the distal end 710a of the arm portion 710 moves along the left straight end 1120 or the right straight end 1130 of the guide groove 1100, the crank arm 700 disengages from the cylindrical cam 800. Therefore, the rotational force of the crank arm 700 is not transmitted to the cylindrical cam 800 but transmitted only to the tray 1000.

As noted above, in the disc changer shown in FIGS. 29 and 39, the structure to utilize the driving force of a single electric motor for both of the in/out operation of the tray 1000 and the disc clamping/releasing operation of the pick-up unit is realized by dividing the range of rotation of the crank arm to transmit the driving force of the electric motor into the range for driving the tray and the range for driving the pick-up unit. Also in the disc changer disclosed in JP-A 2002-184080, the rotation range of the two-stage gear is divided into the range for driving the tray and the range for driving the pick-up unit, and the mechanism for transmitting the driving force of the single electric motor is basically the same as that shown in FIGS. 29 and 30.

In the structure disclosed in JP-A 2002-184080, the driving force transmission mechanism for transmitting the driving force of the electric motor to the tray and the pick-up unit by utilizing the two-stage gear is complicated and requires a large number of parts. As compared to this, the driving force transmission mechanism using a crank arm shown in FIG. 29 utilizes a simple gear structure and a less number of parts, and hence, is advantageous as the driving force transmission mechanism of a disc changer.

However, in the conventional driving force transmission mechanism utilizing a crank arm, the guide groove 1100 comprises an arcuate, intermediate curve 1110 and a left and a right straight ends 1120 and 1130 connected to opposite ends of the intermediate curve. Therefore, when the distal end 710a of the arm portion 710 moves from the intermediate curve 1110 to the left straight end 1120 or the right straight end 1130, a large rotational force is suddenly transmitted from the crank arm 700 to the tray 1000. On the other hand, when the distal end 710a of the arm portion 710 moves from the left straight end 1120 or the right straight end 1130 to the intermediate curve 1110, the rotational force which has transmitted from the crank arm 700 to the tray 1000 suddenly disappears. Therefore, the tray 1000 cannot move smoothly at the start of the movement and the end of the movement.

Further, when the distal end 710a of the arm portion 710 is rotated counterclockwise from the state shown in FIG. 29 so that the distal end 710a of the arm portion 710 reciprocates through the left straight end 1120 of the guide groove 1100 and reaches the boundary between the end and the intermediate curve 1110, the distal end 710a of the arm portion 710 has difficulty in moving to the intermediate curve 1110. Therefore, the crank arm 700 need be stopped at this position. The stop position of the crank arm 700 corresponds to the position at which the pull-out amount of the tray 100 becomes maximum. When a crank arm 700 having a shorter arm length is used, the guide groove 1100 of the tray 1000 need be formed closer to the crank arm 700, so that the maximum pull-out amount of the tray 1000 is reduced. Conversely, in the conventional driving force transmission mechanism using a crank arm, to increase the maximum pull-out amount of the tray 1000, the arm length of the crank arm 700 need be increased, which leads to an increase in the size of the crank arm 700.

Further, in the method in which the driving force of the single electric motor 500 is transmitted to the crank arm 700 and the object to which the driving force is transmitted is switched between the tray 1000 and the pick-up unit depending on the rotation range of the crank arm 700, the operational states of the disc changer (such as a disc changing state, a disc clamping state or a disc playing state) are related with the rotation-l position of the Frank arm 700. Therefore, to control the operation of the disc changer, the rotational position of the crank arm 700 need be detected to utilize the detection signals for the control.

For example, at least four operational states need be detected, i.e., (1) the state in which the tray is pulled out of the housing (hereinafter referred to as the "open stop position"), (2) the state in which the tray is completely accommodated in the housing (hereinafter referred to as the "close stop position"), (3) the state in which the pick-up unit is clamping a disc (hereinafter referred to as the "clamp position"), and (4) the state in which the pick-up unit is not clamping a disc ("clamp release position"). To detect these, it may be considered to provide switches at the open stop position and the close stop position of the tray, and the clamp position and the clamp release position of the pick-up unit, for example. In this method, however, a large number of switches need be provided at widely separated positions.

As another method for detecting the rotational position of the crank arm, it may be considered to attach, to the crank arm, a rotary encoder generally known as a device for detecting the rotational position of a rotating object.

However, in the driving force transmission mechanism of the above-described disc changer, the rotation range of the crank arm 700 is about ±150° taking the state shown in FIG. 29 as the reference direction, and it is only necessary to divide the rotation range into several regions and determine at which one of the regions the crank arm 700 locates. However, a rotary encoder can detect angles with accuracy which is unnecessary high for the above purpose, and accordingly is expensive. Therefore, to reduce the cost as much as possible, the use of a rotary encoder is not desirable.

DISCLOSURE OF THE INVENTION

An object of the present invention is to provide a disc changer which includes a driving force transmission mechanism for transmitting the driving force of a single driving source to a tray and to a pick-up unit while switching therebetween and which is capable of reducing the size of the crank arm as much as possible, enabling smooth movement of the tray, and detecting the rotational position of the crank arm by a simple structure.

According to a first aspect of the present invention, there is provided disc changer comprising: a tray for carrying a plurality of discs mounted thereto, the tray being arranged in a housing movably back and forth into and out of the housing; a driving source for generating a driving force for performing the in-out movement of the tray; and a driving force transmission for transmitting the driving force generated at the driving source to the tray, the transmission comprising a guide groove formed at a lower surface of the tray to extend right and left and a crank arm arranged below the tray in the housing, the crank arm including a disc-like rotation portion which is rotatable by the driving force of the driving source and an arm portion projecting radially outward from an outer circumference of the rotation portion and having a distal end slidably engaging the guide groove. The guide groove has a bow shape comprising an arcuate intermediate curve generally conforming to an arcuate path along which distal end of the arm portion moves due to the rotation of the crank arm, and left and right end curves extending from opposite ends of the intermediate curve and curved opposite to the intermediate curve.

According to a second aspect of the present invention, there is provided a disc changer comprising: a tray for carrying a plurality of discs mounted thereto, the tray being arranged in a housing movably back and forth into and out of the housing; a reproducer arranged at a predetermined position in the housing to be displaceable up and down for reproducing information recorded on a disc while clamping the disc on the tray; a driving source for generating a driving force for performing the in-out movement of the tray and the displacement of the reproducer; and a driving force transmission for transmitting the driving force generated at the driving source to the tray and to the reproducer while switching between the tray and the reproducer, the transmission comprising a guide groove formed at a lower surface of the tray to extend right and left, a cam for displacing the reproducer up and down to shift the reproducer between a disc clamp position and a clamp release position, and a crank arm arranged below the tray in the housing, the crank arm including a disc-like rotation portion which is rotatable by the driving force of the driving source, an arm portion projecting radially outward from an outer circumference of the rotation portion and having a distal end slidably engaging the guide groove, and a connection portion formed at part of the outer circumference of the rotation portion for connection to the cam to transmit a rotational force of the rotation portion to the cam when the distal end of the arm portion moves through an intermediate portion of the guide groove. The guide groove has a bow shape comprising an arcuate intermediate curve generally conforming to an arcuate path along which the distal end of the arm portion moves due to the rotation of the crank arm, and left and right end curves extending from opposite ends of the intermediate curve and curved opposite to the intermediate curve.

Specifically, the rotational force of the crank arm is transmitted to the tray during when the distal end of the arm portion moves through the left end curve or the right end curve of the guide groove, whereas the rotational force of the crank arm is transmitted to the reproducer via the cam during when the distal end of the arm portion moves through the intermediate curve of the guide groove.

Preferably, the tray pulled out of the housing can be kept at an open stop position when the distal end of the arm portion of the crank arm in a process of moving from the left end curve or right end curve toward the intermediate curve of the guide groove reaches a predetermined position in the left end curve or the right end curve. Specifically, the predetermined position Is adjacent the boundary between the right end curve or the left end curve and the intermediate curve of the guide groove.

Preferably, the cam is cylindrical and has a circumferential surface part of which is formed with a cam groove inclined with respect to a vertical direction and another part of which is formed with teeth, and the connection portion of the crank arm comprises teeth formed at a circumferential surface of the rotation portion at a position which faces the teeth of the cylindrical cam to mesh with the teeth during when the distal end of the arm portion moves through the intermediate curve of the guide groove.

Further, a detector for detecting operational states of the tray and the reproducer may be provided under the rotation portion of the crank arm. The detector may detect the operational states of the tray and the reproducer by detecting the position of the distal end of the arm portion of the crank arm in the guide groove.

Preferably, the detector may detect that the distal end of the arm portion of the crank arm is positioned in the intermediate curve of the guide groove, in the left end curve of the guide groove, in the right end curve of the guide groove, at the position in the left end curve of the guide groove which corresponds to the open stop position of the tray, and at the position in the right end curve of the guide groove which corresponds to the open stop position of the tray.

In a preferred embodiment, the detector may comprise a plurality of ribs respectively formed on a plurality of concentric tracks on a lower surface of the rotation portion of the crank arm, a plurality of switches provided below the rotation portion of the crank arm at positions which face the respective tracks, and a determiner for determining the position of the distal end of the arm portion of the crank arm in the guide groove based on information as to switching operation of the switches performed by the ribs in accordance with the rotation of the rotation portion of the crank arm. Each of the ribs may have opposite ends each of which is formed with a downward slope. The determiner may determine the position of the distal end of the arm portion of the crank arm in the guide groove based on combination of ON/OFF information of the plurality of switches.

According to a third aspect of the present invention, there is provided a disc changer comprising: a tray for carrying a plurality of discs mounted thereto, the tray being arranged in a housing movably back and forth into and out of the housing; a reproducer arranged at a predetermined position in the housing to be displaceable up and down for reproducing information recorded on a disc while clamping the disc on the tray; a driving source for generating a driving force for performing the in-out movement of the tray and the displacement of the reproducer; and a driving force transmission for transmitting the driving force generated at the driving source to the tray and to the reproducer while switching between the tray and the reproducer, the transmission comprising a guide groove formed at a lower surface of the tray to extend right and left; a cam for displacing the reproducer up and down to shift the reproducer between a disc clamp position and a clamp release position, and a crank arm arranged below the tray in the housing, the crank arm including a disc-like rotation portion which is rotatable by the driving force of the driving source, an arm portion projecting radially outward from an outer circumference of the rotation portion and having a distal end slidably engaging the guide groove, and a connection portion which is formed at part of the outer circumference of the rotation portion for connection to the cam to transmit a rotational force of the rotation portion to the cam when the distal end of the arm portion moves through an intermediate portion of the guide groove. A detector for detecting operational states of the tray and the reproducer is provided under the rotation portion of the crank arm.

Preferably, the detector may at least detect a state in which the tray is pulled out from the housing, a state in which the tray is accommodated in the housing, a state in which the reproducer clamps a disc, and a state in which the reproducer releases a disc.

In a preferred embodiment, the detector may comprise a plurality of ribs respectively formed on a plurality concentric tracks on a lower surface of the rotation portion of the crank arm, a plurality of switches provided under the rotation portion of the crank arm at positions which face the respective tracks, and a determiner for determining the operational state of the tray and the reproducer based on information as to switching operation of the switches performed by the ribs in accordance with the rotation of the rotation portion of the crank arm. Each of the ribs may have opposite ends each of which is formed with a downward slope. The determiner may determine the operational state of the tray and the reproducer based on combination of ON/OFF information of the plurality of switches.

According to the disc changer of the present invention, the rotation portion of the crank arm rotates by the driving force generated at the driving source so that the distal end of the arm portion of the crank arm rotates while drawing a circular path. Since the distal end of the arm portion of the crank arm slidably engages the bow-shaped guide groove of the tray, the rotational force of the crank arm is transmitted to the tray when the distal end of the arm portion slides along the guide groove.

The transmission of the rotational force of the crank arm to the tray is performed when the distal end of the arm portion of the crank arm moves through opposite ends of the guide groove, i.e., the left end curve or the right end curve of the groove, and is not performed when the distal end moves through the intermediate curve provided at the center of the guide groove.

The opposite ends of the guide groove for transmitting the rotational force of the crank arm to the tray are curved opposite to the intermediate curve. Therefore, when the distal end of the guide groove moves from the intermediate curve to the left end curve or the right end curve of the guide groove with the guide groove positioned on the rear side of the rotation portion of the crank arm, the straight movement forth for moving the tray back and forth, which is generated when the distal end of the arm portion moves through the left end curve or the right end curve, gradually increases. Therefore, the tray starts to move slowly to the front side (open direction) from the state accommodated and stopped in the tray.

Thereafter, as the guide groove moves forward relative to the rotation portion of the crank arm due to the forward movement of the tray, the distal end of the arm moves so as to reciprocate along the left end curve or the right end curve. During this movement, the straight movement forth transmitted to the tray gradually increases as the distal end of the arm moves toward the terminal end of the left end curve or the right end curve and gradually reduces as the distal end of the arm moves from the terminal end of the left end curve or the right end curve toward the intermediate curve.

Therefore, the tray which has started to move is pulled out from the housing while gradually increasing the speed of the movement. Then, while gradually reducing the speed of the movement in the intermediate process, the tray is pulled out of the housing and stopped at a predetermined open stop position.

Therefore, in the disc changer according to the present invention, the movement of the tray can be performed smoothly.

Further, although the conventional guide groove includes straight portions extending right and left from opposite ends of the intermediate curve, the guide groove of the present invention includes curved portions which extend from opposite ends of the intermediate curve so as to include discontinuous boundary between the intermediate curve and each straight portion in the conventional guide groove. Therefore, according to the present invention, the boundary between the intermediate curve and each of the curves provided at opposite ends thereof can be made closer to the center of the guide groove than the boundary between the intermediate curve and each of the straight portions provided at opposite ends thereof in the conventional guide groove.

When the open stop position of the tray is set to the position at which the distal end of the arm portion is moved to the above-described boundary in the guide groove with the guide groove positioned on the front side relative to the rotation portion of the crank arm, the amount of movement of the distal end of arm portion of the crank arm, and hence the pull-out amount of the tray can be made larger than the structure utilizing the conventional guide groove. Conversely, when the pull-out amount of the tray is equal, the crank arm can be made smaller than the conventional one.

Further, in the disc changer according to the present invention, the object to which the rotational force of the crank arm is transmitted is switched between the tray and the reproducer depending on the rotational position of the crank arm. Therefore, by detecting the rotational position of the crank arm by using the detector provided under the rotation portion of the crank arm, it is possible to detect a plurality of operational states such as the state in which the tray is pulled out from the housing, the state in which the tray is accommodated in the housing, the state in which the reproducer clamps a disc, and the state in which the reproducer releases a disc, for example.

Therefore, the detector for detecting the operational state of the tray and the reproducer can be made compact. The detector comprises a plurality of ribs provided at the lower surface of the rotational portion of the crank arm, a plurality of switches operated by the ribs in accordance with the rotation of the crank arm, and a determiner for determining the operational state of the tray and the reproducer based on the operation information of the switches. Therefore, the plurality of operational states of the tray and the reproducer can be detected by using the possibly smallest number of switches, whereby the structure of the detector can be simplified and the manufacturing cost thereof can be reduced.

BEST MODE FOR CARRYING OUT THE INVENTION

Preferred embodiments of the present invention will be described below with reference to FIGS. 1-10.

Figure 1:
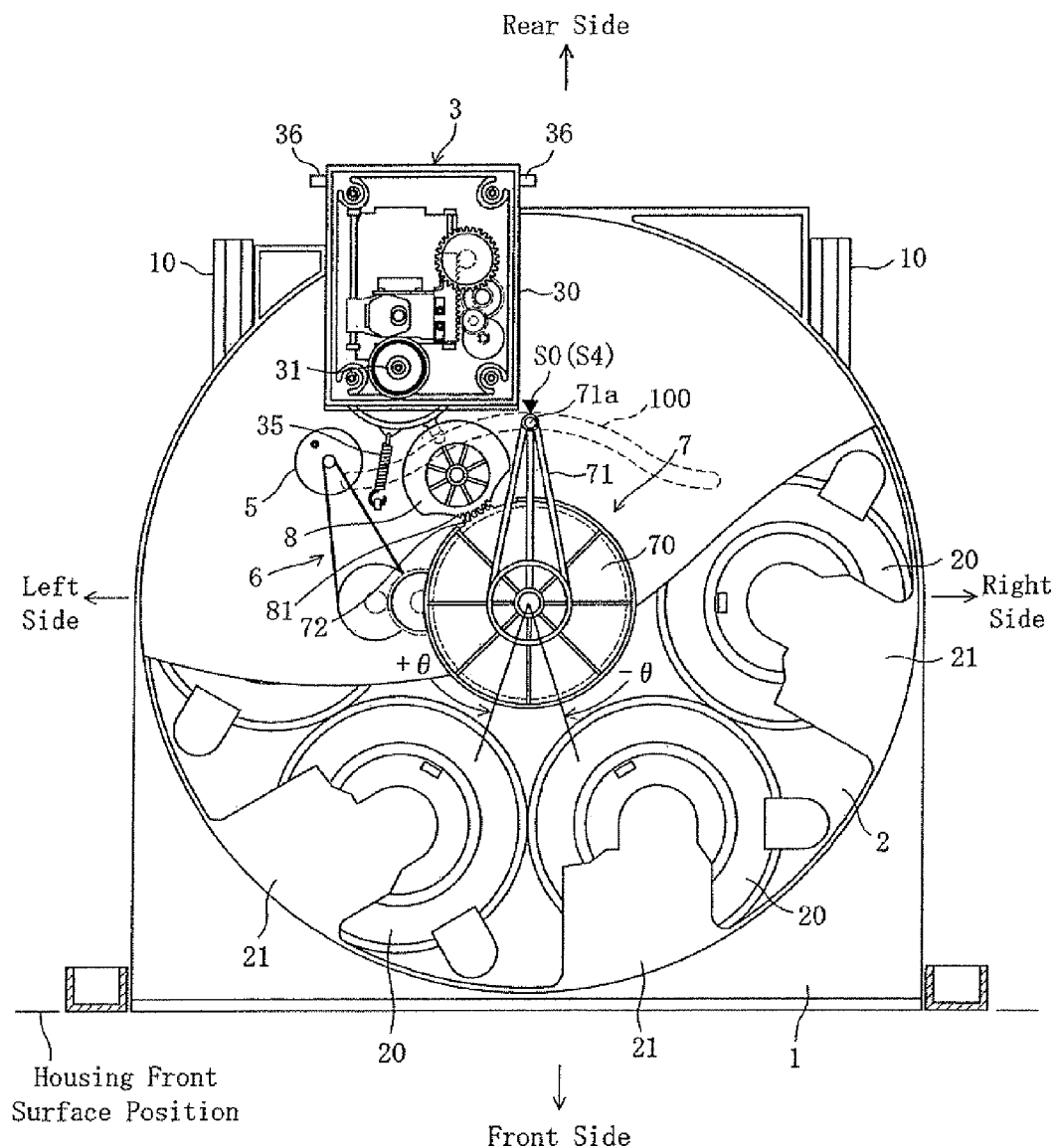
FIG. 1 is a top view showing the driving mechanism of a tray and a pick-up unit of a disc changer according to the present invention.

FIG. 1 is a top view showing a driving mechanism of a tray and a pick-up unit of a disc changer according to the present invention. Although a drive motor 5, a speed reduction mechanism 6, a crank arm 7 and a cylindrical cam 8 are provided on the lower surface side of the tray 1 (deeper side with respect to the sheet surface) and cannot be seen actually, these members are visibly illustrated for convenience of the description.

Figure 2:
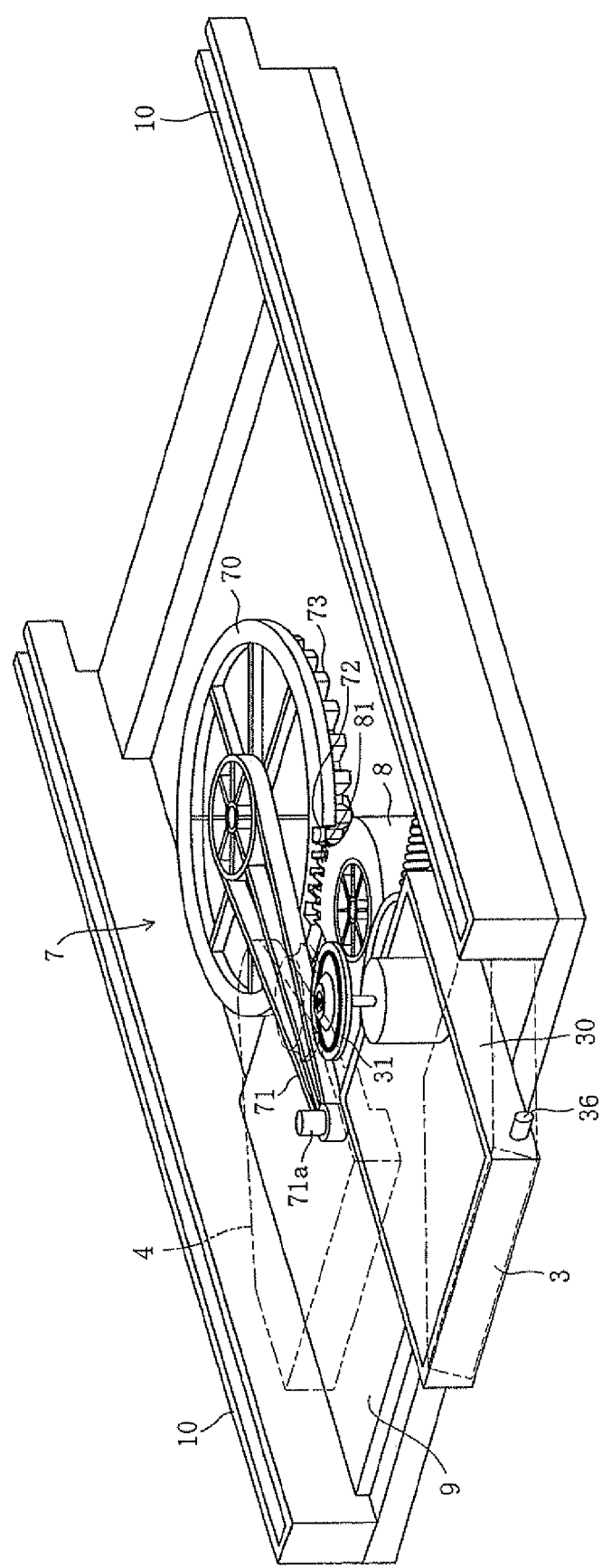
FIG. 2 is a perspective view showing the positional relationship between a crank arm and a cylindrical cam provided on the lower surface side of the tray, and the pick-up unit.
Figure 3:
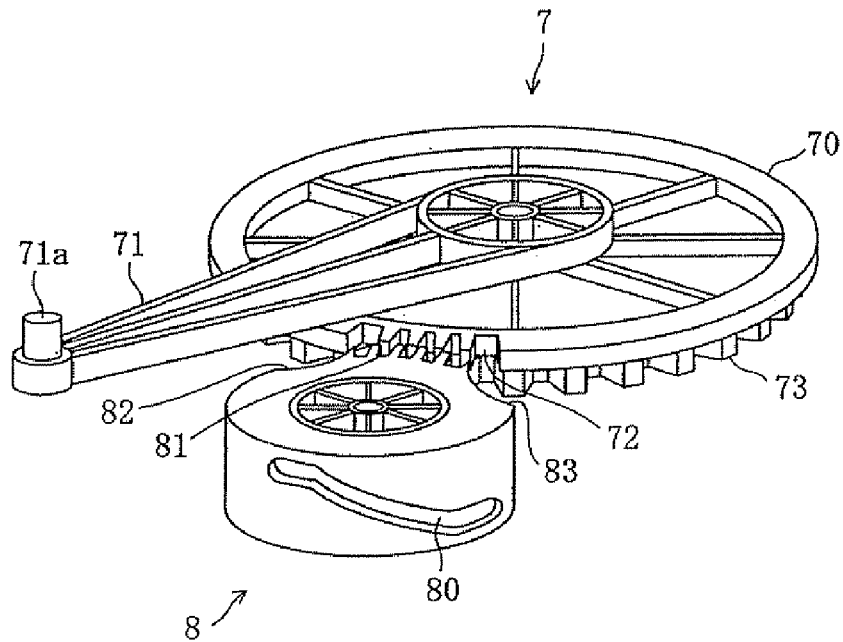
FIG. 3 is a perspective view showing the state in which the cylindrical cam meshes with the crank arm.
Figure 4:
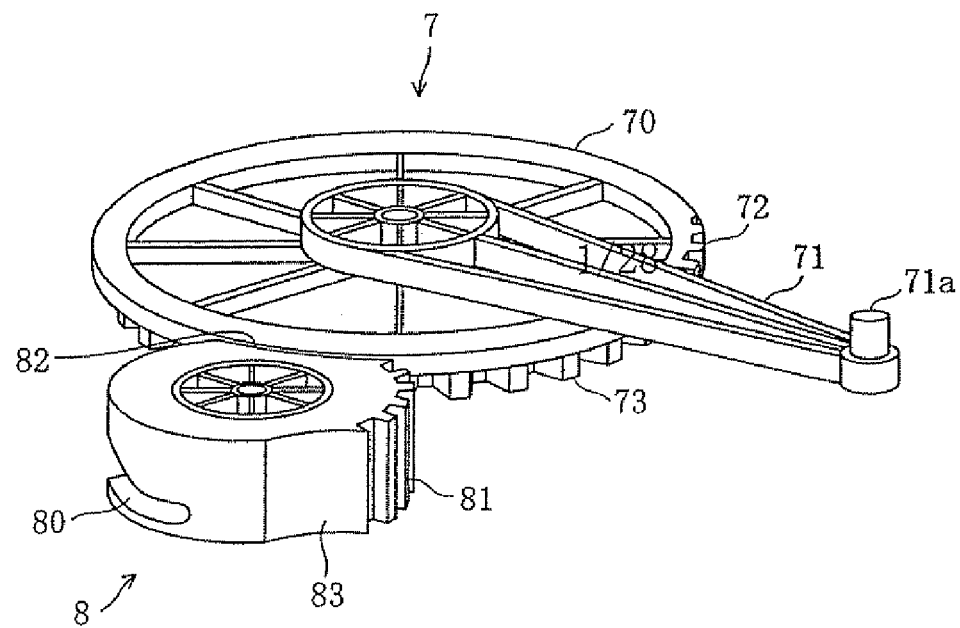
FIG. 4 is a perspective view showing the state in which cylindrical cam does not mesh with the crank arm.

FIG. 2 is a perspective view showing the positional relationship between the crank arm 7 and the cylindrical cam 8 provided on the lower surface side of the tray 1, and the pick-up unit 3. FIG. 3 is a perspective view showing the state in which the cylindrical cam 8 meshes with the crank arm 7, whereas FIG. 4 is a perspective view showing the state in which cylindrical cam 8 does not mesh with the crank arm 7.

Figure 5:
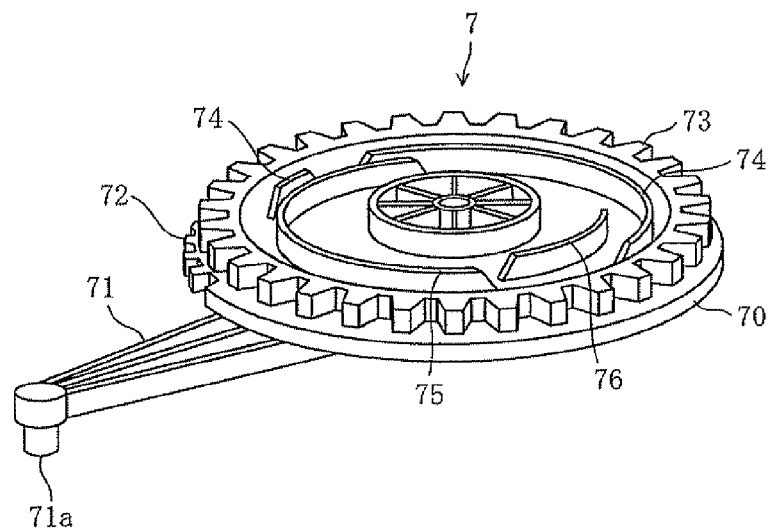
FIG. 5 is a perspective view showing the structure of the lower surface side of the crank arm.
Figure 6:
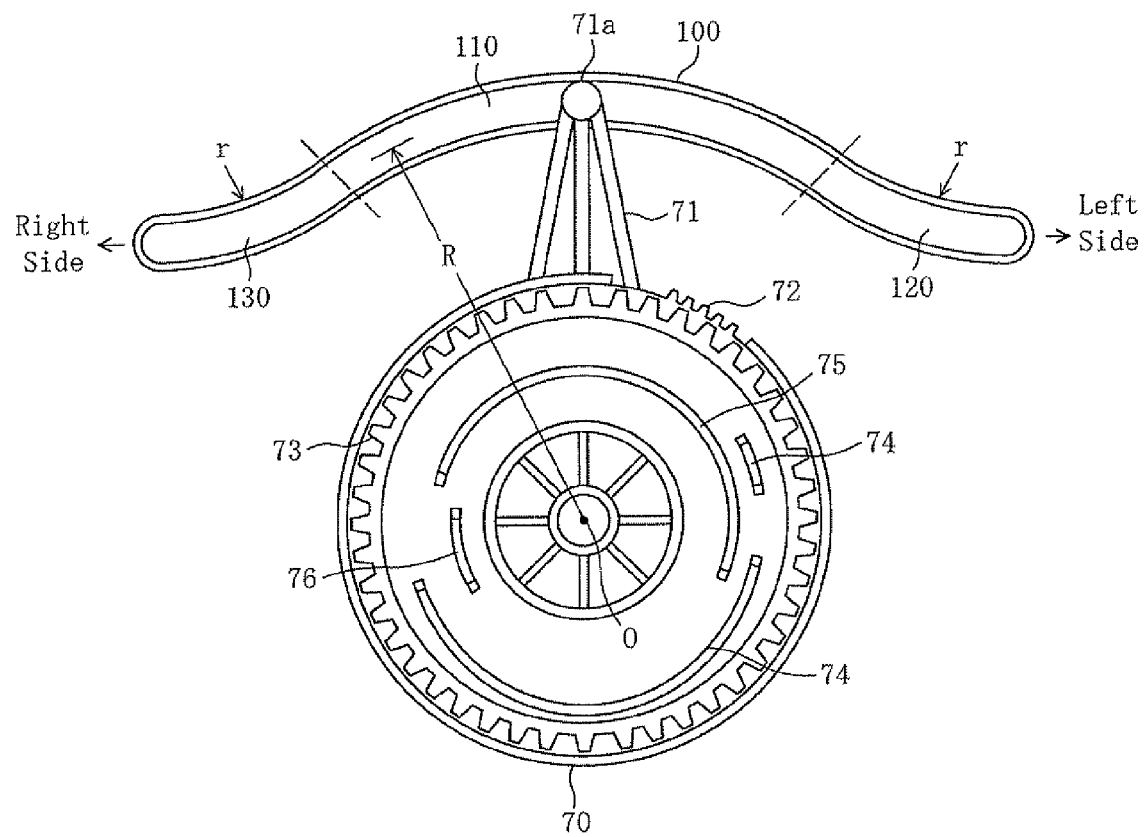
FIG. 6 is a plan view showing the positional relationship between the crank arm and the guide groove.
Figure 7:
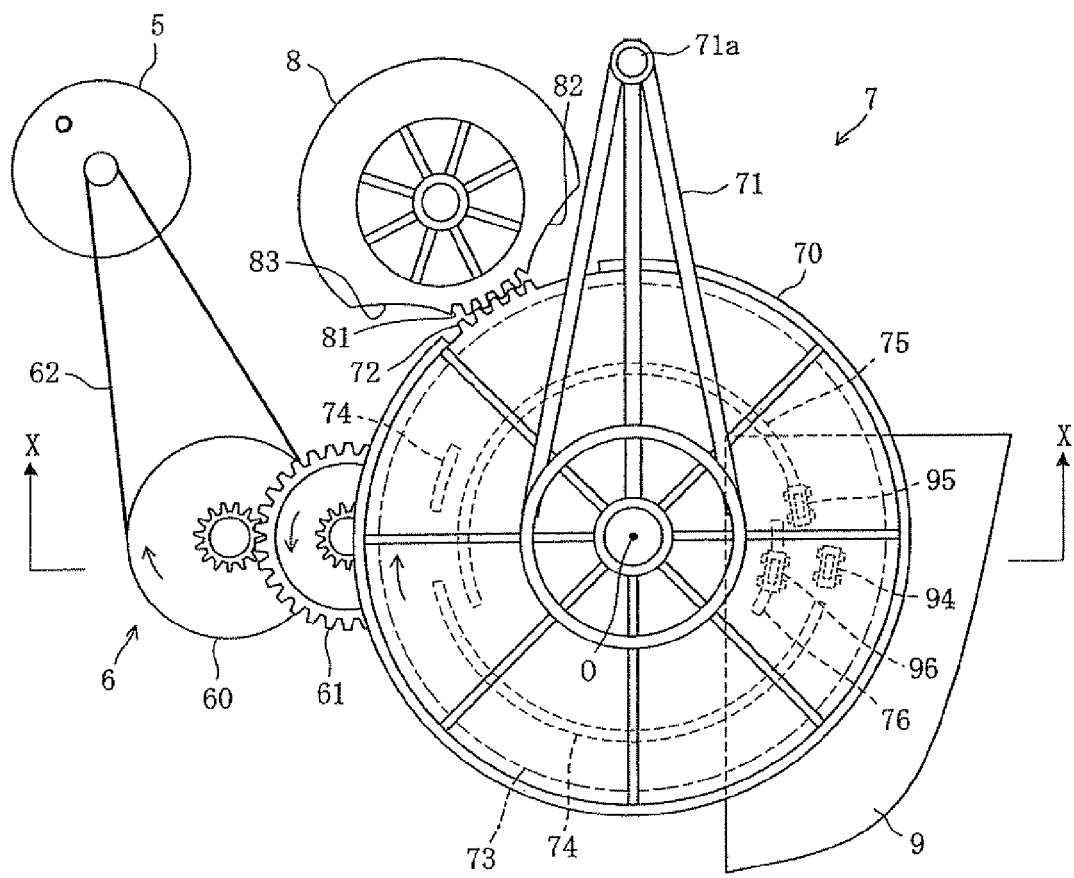
FIG. 7 shows a mechanism for transmitting the driving force of a drive motor to the crank arm.
Figure 8:
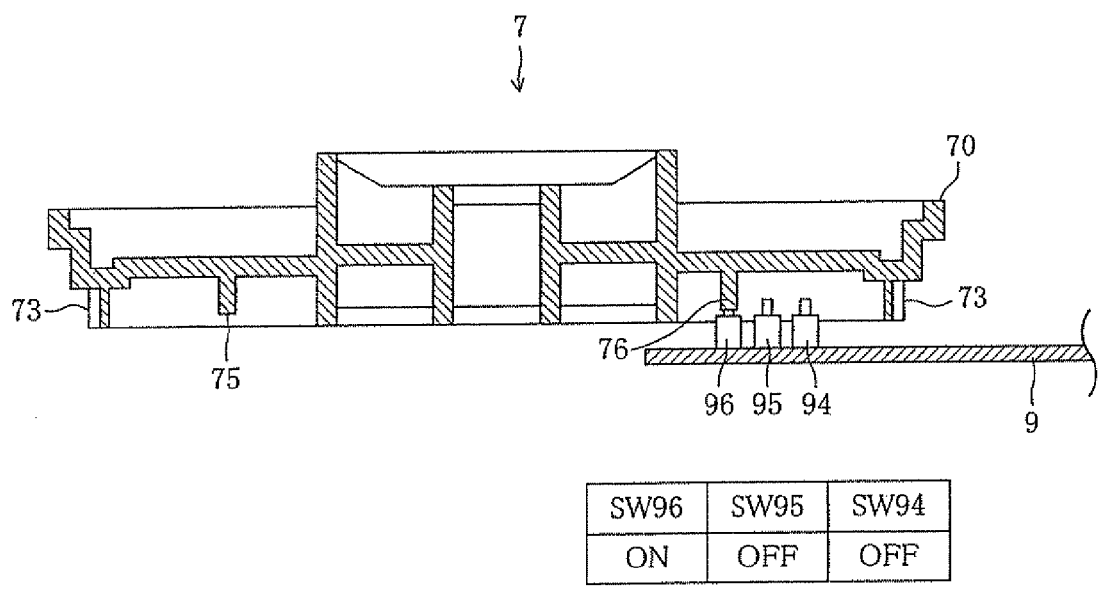
FIG. 8 is a sectional view taken along lines X-X in FIG. 7.

FIG. 5 is a perspective view showing the structure of the lower surface side of the crank arm 7 FIG. 6 shows the positional relationship between the crank arm 7 and a guide groove 8. FIG. 7 shows the driving mechanism for the tray 1 and the pick-up unit 3. FIG. 8 is a sectional view taken along lines X-X in FIG. 7.

Figure 9:
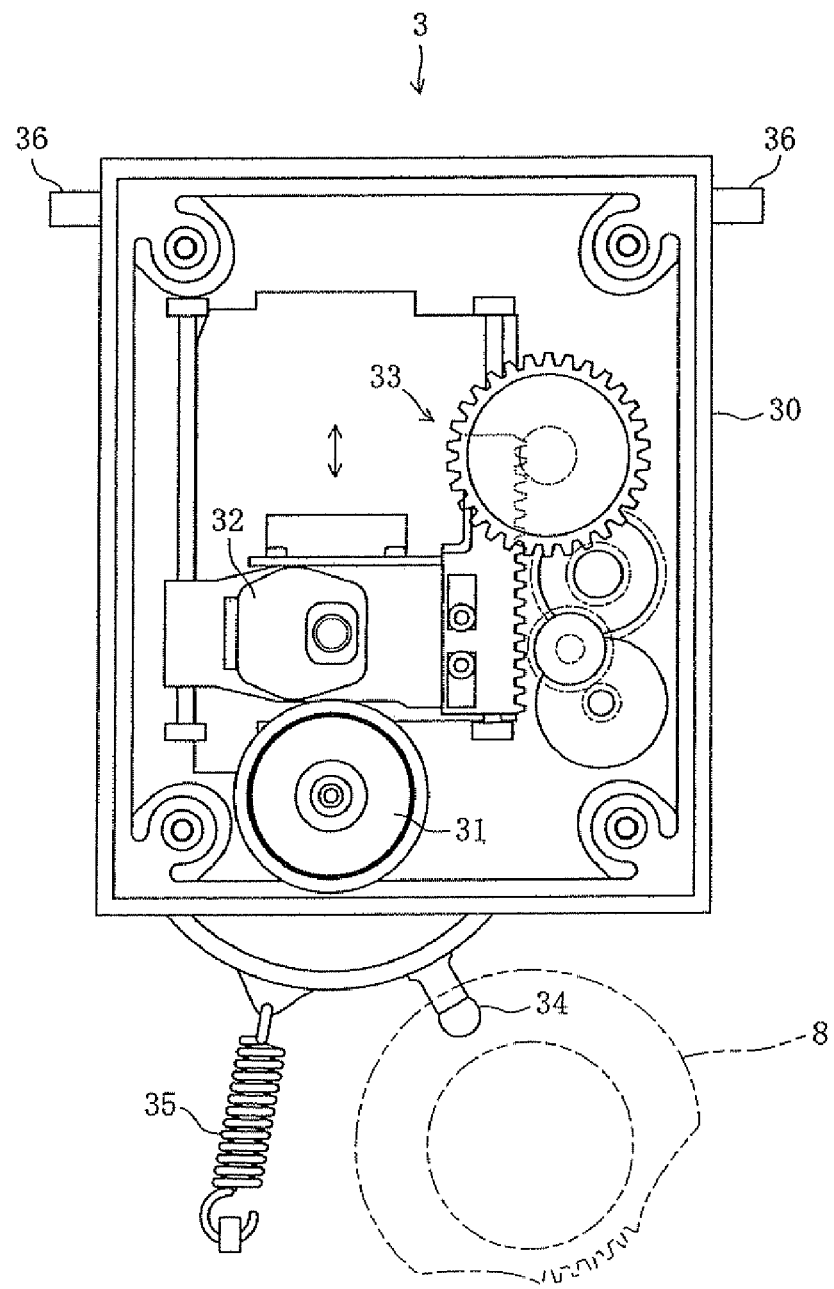
FIG. 9 is a plan view showing the structure of the pick-up unit.
Figure 10:
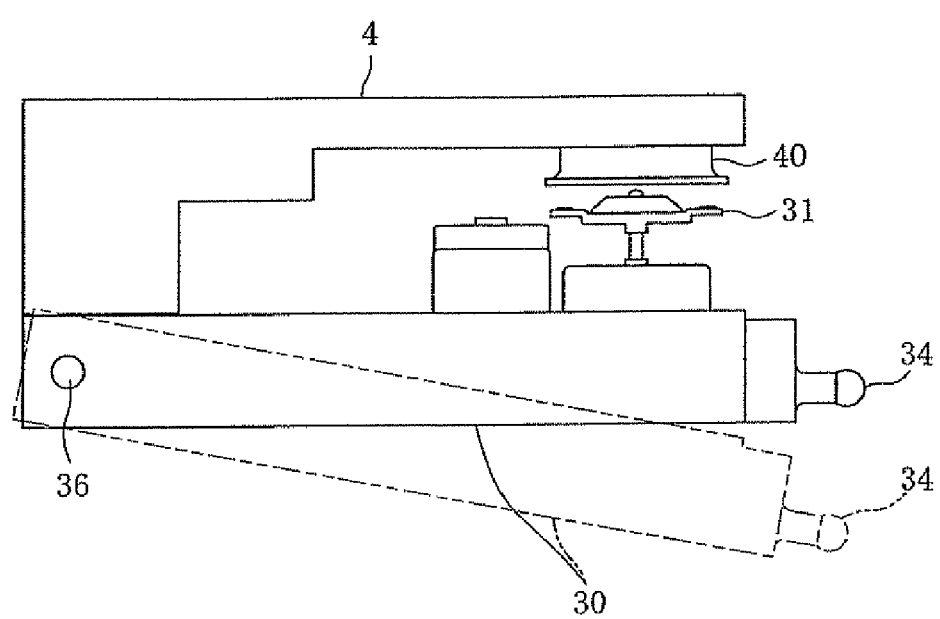
FIG. 10 is a side view showing the relationship between the pick-up unit and a chucking cover.

FIG. 9 is a plan view showing the structure of the pick-up unit 3. FIG. 10 is a side view showing the relationship between the pick-up unit and a chucking cover.

The disc changer can accommodate up to six discs, such as CDs or DVDs, for successively playing the discs. As a mechanism for mounting and removing discs and a mechanism for playing a designated one of the mounted discs, the disc changer includes, in a non-illustrated housing, the tray 1, a roulette table 2, the pick-up unit 3 (reproducer), the chucking cover 4 (See FIG. 2), the drive motor 5, the speed reduction mechanism 6, the crank arm 7, the cylindrical cam 8 and a control board 9 (See FIG. 2) on which e.g. a microcomputer is mounted.

The tray 1 and the roulette table 2 are the structural elements of the disc mounting/removing mechanism. The pick-up unit 3 and the chucking cover 4 are the structural elements of the disc playing mechanism. The drive motor 5, the speed reduction mechanism 6, the crank arm 7 and the cylindrical cam 8 are the structural elements of a driver (hereinafter referred to as the "tray driver") for moving the tray 1 into and out of the main body for mounting and removing a disc, and a driver (hereinafter referred to as the "pick-up unit driver") for causing the pick-up unit to clamp a disc mounted to the unit to play the disc.

The tray driver and the pick-up unit driver are made up of the drive motor 5 as a driving source, and a driving force transmission mechanism for transmitting the driving force of the drive motor 5 to the tray 1 and to the pick-up unit 3 while switching therebetween. The speed reduction mechanism 6, the crank arm 7, the cylindrical cam 8, the guide groove 100 formed at the lower surface (reverse surface located behind the sheet surface of FIG. 1) of the tray 1 and a pin 34 connecting the pick-up unit 3 to the cylindrical cam 8 are the structural elements of the driving force transmission mechanism.

In the disc changer of this embodiment, the driving force of the drive motor 5 is transmitted to the crank arm 7 to rotate the crank arm 7, and the rotational force of the crank arm 7 is converted into a force for straight movement and transmitted to the tray 1 to move the tray 1 into and out of the main body. The conversion of the rotational movement of the crank arm 7 into the straight movement is performed by moving the distal end 71a of an arm portion 71 of the clamp arm 7 along the bow-shaped guide groove 100 formed at the lower surface of the tray 1.

Further, by transmitting the rotational force of the crank arm 7 to the cylindrical cam 8, the cylindrical cam 8 rotates to cause the pick-up unit 2 to perform the disc clamping and releasing operation. The transmission of the rotational force of the crank arm 7 to the cylindrical cam 8 is performed by meshing intermittent teeth 72 formed at a predetermined position on a circumferential surface of a rotation portion 70 of the crank arm 7 with outer circumferential teeth 81 formed at a predetermined position on the circumferential surface of the cylindrical cam 8.

In the crank arm 7, when the direction extending from the center O (See FIG. 6) of the rotation portion 70 to the rear side of the main body in parallel with the back and forth direction is determined as the reference direction of the rotation of the arm portion 71, the arm portion 71 is rotatable in the angular range of ±θ (θ is slightly smaller than 180° and about 160° in this embodiment). In the angular range ±α (about ±18° in FIG. 1) within the above range, the distal end 71a of the arm portion 71 moves along the intermediate curve of the guide groove 100. During this movement, the rotational force of the crank arm 7 is not transmitted to the tray 1, while the intermittent teeth 72 of the rotation portion 70 mesh with the outer circumferential teeth 81 of the cylindrical cam 8 so that the rotational force of the crank arm 7 is transmitted to the rotation cam 8.

On the other hand, in the angular range from +α to +θ and the angular range from −α to −θ, the distal end 71a of the arm portion 71 moves along opposite curved ends of the guide groove 100. During this movement, although the rotational force of the crank arm 7 is transmitted to the tray 1, the intermittent teeth 72 of the rotation portion 70 do not mesh with the outer circumferential teeth 81 of the cylindrical cam 8 so that the rotational force of the crank arm 7 is not transmitted to the rotation cam 8.

To be exact, the points close to the angular positions of ±α, the driving force of the drive motor 5 is transmitted to the cylindrical cam 8 and the tray 1. Therefore, these points serve as the switching points where the switching between the transmission of the driving force of the drive motor 5 to the cylindrical cam 8 and the transmission to the tray 1 is performed with partial overlapping.

Therefore, if the switching points where the target of transmission of the driving force is switched is not taken into consideration, the period in which the arm portion 71 of the crank arm 7 moves in the angular range of ±α is a period for clamping and releasing a disc by the pick-up unit 3, whereas the period in which the arm portion 71 of the crank arm 7 moves in the angular range from +α to +θ and the angular range from αα to −θ is a period for moving the tray 1 into and out of the main body.

Although detailed description will be given later, when the arm portion 71 of the crank arm 7 moves in the angular range from −α to −θ, the pick-up unit 3 keeps clamping a disc. Therefore, this angular range corresponds to a period in which, while playing a disc, the crank arm 7 is rotated to move the tray 1 out of and into the main body to change a disc which is not being played.

When the arm portion 71 of the crank arm 7 moves in the angular range from +α to +θ, the pick-up unit 3 does not clamp a disc. Therefore, this angular range corresponds to a period for rotating the crank arm 7 to move the tray 1 out of and into and the main body to mount or exchange a disc before playing.

When the arm portion 71 of the crank arm 7 moves in the angular range from −α to +θ, the tray 1 is accommodated in the main body. When the arm portion 71 of the crank arm 7 rotates in a direction from the angular position of +α toward the angular position of −α (clockwise in FIG. 1), the front end of the pick up unit 3 is lifted from the lower surface side (clamp release position) to the upper surface side (clamp position) of the tray 1 by the rotation of the cylindrical cam 8, whereby clamping of a disc is performed. Conversely, when the arm portion 71 of the crank arm 7 rotates in a direction from the angular position of −α toward the angular position of +α (counterclockwise in FIG. 1), the front end of the pick up unit 3 is lowered from the upper surface side (clamp position) to the lower surface side (clamp release position) of the tray 1 by the rotation of the cylindrical cam 8, whereby the clamp release operation is performed. Therefore, this angular range corresponds to a period for rotating the crank arm 7 to rotate the cylindrical cam 8 to clamp or release a disc by the pick-up unit 3.

The tray 1 serves to move the roulette table 2 into and out of the housing. The roulette table 2 serves to load six discs into the housing and transport the disc to be played to a predetermined position within the housing. (This position is the position where data is read from the disc and corresponds to the position of the pick-up unit in FIG. 1. Hereinafter, this position is referred to as the "read position".)

The tray 1 comprises a plate member of a size capable of carrying the roulette table 2 horizontally. To allow the pick-up unit 3 to move from the lower surface side to the upper surface side of the tray 1 to clamp a disc, the tray is formed with a rectangular opening (cutout) at the rear end which covers the pick-up unit 3 when the tray 1 is accommodated in the housing (at the location slightly offset to the left from the center of the rear end of the tray 1 in FIG. 1).

The roulette table 2 comprises a circular plate having an upper surface formed with circular recesses which serve as mount portions 20 for carrying six discs mounted thereto as radially aligned along the periphery thereof. The roulette table 2 is rotatably supported by the tray 1. The roulette table is rotated by a driving force of an electric motor (not shown) provided separately from the drive motor 5.

Each of the mount portions 20 of the roulette table 2 is formed with an opening (cutout) 21 so that, when the mount portion is transported to the read position by the rotation of the roulette table 2, part of the lower surface of the disc including the center hole faces the pick-up unit 3 located below through the opening formed in the tray 1. When the pick-up unit 3 clamps a disc, the pick-up unit moves upward from a position below the roulette table 2 beyond the upper surface of the roulette table 2. The opening of the tray 1 and the opening 21 of each mount portion 20 are provided to allow the upward movement of the pick-up unit.

The tray 1 is supported movably by a pair of rails 10, 10 (See FIG. 2) arranged in the housing to extend in the back and forth direction. When the driving force is transmitted by the crank arm 7 to the tray 1, the tray moves horizontally in the back and forth direction (See FIG. 1) along the rails 10, 10. By the movement of the tray 1 in the back and forth direction, the roulette table 2 is put into and taken out of the housing.

FIG. 1 shows the state in which the tray 1 is completely accommodated in the housing (closed state). When the tray 1 moves from the closed state horizontally to the front side, about half of the roulette table 2 is pulled out of the housing (open state). (In FIG. 1, of the disc mount portions 20 of the roulette table 2, at least two mount portions 20 aligned on the front side are completely exposed in the open state.) Though not illustrated, the tray 1 is provided, at a lower portion thereof, with a member which engages a stopper provided in the housing when the tray comes to the stop position in the closed state (hereinafter referred to as the "close stop position") and to the stop position in the open state (hereinafter referred to as the "open stop position"). The engagement between the engagement member and the stopper prevents the tray 1 from moving back and forth beyond the close stop position and the open stop position.

The pick-up unit 3 functions to clamp a disc transported to the read position by taking out the disc so as to float from the lower side of the roulette table 2 and read the information recorded on the disc while rotating the disc in that state at a predetermined number of revolutions. The pick-up unit 3 is arranged at a posit-on which corresponds to the opening of the tray 1 when the tray 1 is at the close stop position.

As shown in FIG. 9, the pick-up unit 3 is a box-like member having an elongated rectangular configuration in plan view and a relatively low height. The pick-up unit 3 includes a chassis 30 incorporating a turntable 31 which supports the lower surface of a disc and is made of a magnetic material, a spindle motor fixed to the center of the lower surface of the turntable 31 (not shown because it is located under the turntable 31), an optical component 32 for reading information recorded on a disc and a driving mechanism 33 for moving the optical component 32 in the radial direction of a disc (indicated by the arrow in FIG. 9). As shown in FIG. 10, the pick-up unit 3 is pivotally mounted to the housing via a rotation shaft 36 projecting from opposite side surfaces of the chassis 30 at the rear end. The front end of the pick-up unit 3 is pivotable up and down about the rotation shaft 36.

As shown in FIGS. 9 and 10, the front end of the chassis 30 is provided with a pin 34 projecting therefrom. The distal end of the pin is connected to an outer circumferential groove 80 formed at the circumferential surface of the cylindrical cam 8, which will be described later. The front end of the chassis 30 is further provided with a spring 35 having a distal end fixed to the bottom of the housing so that a force in the downward direction is exerted to the front end of the pick-up unit 3 by the resilient force of the spring. As shown in FIG. 3, the outer circumferential groove 80 formed at the circumferential surface of the cylindrical cam 8 is inclined with respect to the vertical. Therefore, when the pin 34 moves along the outer circumferential groove 80 due to the rotation of the cylindrical cam 8, the front end of the pick-up unit 3 moves up and down.

The front end of the pick-up unit 3 is biased downward by the spring 35. Therefore, in accordance with the rotation of the cylindrical cam 8, the pin 34 moves stably without rattling along the outer circumferential groove 80 while being pressed against the lower surface of the outer circumferential groove 80.

As indicated by double-dashed lines in FIG. 10, in the waiting state in which a disc is not played or in moving the tray 1 to exchange discs, the front end of the pick-up unit 3 is kept inclined downward about the rotation shaft 36 (clamp release state) for avoiding the interference with the tray 1. As indicated by solid lines in FIG. 10, in playing a disc, the pick-up unit 3 is kept generally horizontal (clamp state) to sandwich the disc between the turntable 31 and a rotating member 40.

The rotating member 40, which is magnetized and has a disc-like shape, is rotatably supported by the chucking cover 4. The chucking cover 4 is disposed above the pick-up unit 3. When the front end of the pick-up unit 3 moves upward from under the roulette table 2 and picks up a disc, the rotating member 40 functions to sandwich the disc between itself and the turntable 31 by utilizing the attraction power of the magnetic force. As shown in FIG. 10, the rotating member 40 is provided at the front end of the chucking cover 4 and at a position which faces the turntable 31 when the front end of the pick-up unit 3 is lifted.

When the front end of the pick-up unit 3 is lifted to play a disc, the turntable 31 picks up the disc disposed on the roulette table 2 by floating the disc from the lower side. When the turntable 31 comes close to the rotating member 40, the rotating member 40 attracts the turntable 31 by the magnetic force so that the disc is sandwiched between the rotating member 40 and the turntable 31 by the attraction force (clamp operation). When the spindle motor is driven in this state, the turntable 31 rotates, whereby the disc clamped by the turntable 31 and the rotating member 40 rotates.

The drive motor 5 is a driving source for moving the tray 1 into and out of the housing and for moving the pick-up unit 3 up and down for clamping the disc to be played. The speed reduction mechanism 6 is a mechanism for transmitting the driving force of the drive motor 5 to the crank arm 7. The crank arm 7 functions to transmit the driving force of the drive motor 5 transmitted through the speed reduction mechanism 6 to the tray 1 or the cylindrical cam 8.

As shown in FIG. 7, the speed reduction mechanism 6 comprises two gears 60 and 61 provided between the drive motor 5 and the crank arm 7, and a belt 62 looped around the gear 60 and the rotation shaft of the drive motor 5. The gear 60 is structured as a two-stage gear made up of a pulley and a small toothed wheel, whereas the gear 61 is structured as a two-stage gear made up of a large toothed wheel and a small toothed wheel. The belt 62 is looped around the pulley of the gear 60, and the small toothed wheel of the gear 60 and the large toothed wheel of the gear 61 constantly mesh with each other. The small toothed wheel of the gear 61 constantly meshes with constant engagement teeth of the crank arm 7 (which will be described later).

With the above structure, the driving force of the drive motor 5 is transmitted to the gear 60 via the belt 62 and further transmitted to the crank arm 7 via the gear 61 and the constant engagement teeth 73. The gears 60 and 61 function to adjust and reduce the number of revolutions of the drive motor 5 to be transmitted to the crank arm 7 and also functions to make the rotational direction of the crank arm correspond to the rotational direction of the drive motor 5. Specifically, in FIG. 7, when the drive motor 5 rotates clockwise, the crank arm 7 also rotates clockwise.

The drive motor 5 is controlled by the microcomputer (not shown) mounted on the control board 9. By controlling the driving of the drive motor 5, the microcomputer controls the entire operation of the device such as moving the tray 1 out of and into the housing, and clamping and playing a disc by the pick-up unit 3. The microcomputer detects the state of the tray 1 (such as the open state, close state, moving state from open to close or moving state from close to open), or specifically, detects seven positions of the tray 1 which will be described later and controls the driving of the tray 1 and the pick-up unit 3 based on the detection results. To input the positional information for detecting the seven positions of the tray 1 into the microcomputer, the control board 9 is provided with three microswitches 94-96 (See FIGS. 7 and 8), whereas the lower surface of the rotation portion 70 of the crank arm 7 is formed with four ribs 74-76 (See FIG. 7) for turning on and off the microswitches 94-96. Details of the detection of the position of the tray 1 will be described later.

The crank arm 7 is provided on the lower surface side of the tray 1 so as to rotate within a horizontal plane. The crank arm 7 is so positioned that the rotation center (the rotation center O of the rotation portion 70) corresponds to the rotation center of the roulette table 2 mounted to the tray 1 when the tray 1 is accommodated in the housing. The crank arm 7 is made up of the rotation portion 70 having a disc-like shape, the arm portion 71, the intermittent teeth 72, the constant engagement teeth 73, and the first through the third ribs 74-76 for the rotational position detection. The rotation portion 70 functions to receive the driving force of the drive motor 5 transmitted via the speed reduction mechanism 6 to rotate the crank arm 7. Further, when the crank arm 7 rotates in the angular range from $-\alpha$ to $+\alpha$ described above, the rotation portion functions to transmit the driving force to the cylindrical cam 8 to pivot the cylindrical cam 8. The arm portion 71 functions to transmit the rotational force of the crank arm 7 to the tray 1 to move the tray 1 straight in the back and forth direction.

The rotation portion 70 and the arm portion 71 are integral with each other, and the crank arm 7 rotates about the center O of the rotation portion 70 as the rotation axis. When the rotation portion 70 rotates, the distal end 71a of the arm portion 7 moves to draw a circular path.

As shown in FIG. 3, the distal end 71a of the arm portion 71 is formed with a columnar projection projecting in a direction to face the lower surface of the tray 1. As shown in FIG. 6, the projection of the distal end 71a of the arm portion 71 is fitted in the bow-shaped guide groove 100 formed at the lower surface of the tray 1 to extend right and left (width direction of the device).

The guide groove 100 includes an arcuate, intermediate curve 110 having a constant radius of curvature R, and a left and a right arcuate end curves 120 and 130 which are connected to opposite ends of the intermediate curve 110, curved to the intermediate curve 110 and have a radius of curvature r. The radius of curvature R of the intermediate curve 110 is equal to the distance from the rotation center O of the crank arm 7 to the distal end 71a of the arm portion 71. It is to be noted that, since FIG. 6 shows the crank arm 7 and the guide groove 100 as viewed from the lower surface side, the orientation of the left end curve 120 and the right end curve 130 is reversed. That is, the left side in the figure corresponds to the right side of the tray 1, whereas the right side in the FIG. corresponds to the left side of the tray 1.

When the distal end 71a of the arm portion 71 moves while drawing a circular path due to the rotation of the crank arm 7, during when the distal end 71a moves through the left end curve 120 or the right end curve 130 of the guide groove 100, the rotational force is converted into a force for straight movement and transmitted to the tray 1 to move the tray 1 in the back and forth direction. When the distal end 71a of the arm portion 71 moves through the intermediate curve 110 of the guide groove 100, the rotational force of the crank arm 7 is not transmitted to the tray 1 and the tray 1 is kept stopped, because the intermediate curve 110 conforms to the circular path of the distal end 71a of the arm portion 71.

When the crank arm rotates within a predetermined angular range, the intermitted teeth 72 serve to transmit the rotational force of the crank arm 7 to the cylindrical cam 8 by meshing with the outer circumferential teeth 81 of the cylindrical cam 8, which will be described later. The intermittent teeth 72 are formed at part of the outermost circumference of the rotation portion 70. Specifically, when the direction in which the arm portion 71 of the crank arm projects is determined as the angular reference in the rotation direction of the crank arm 7, the intermittent teeth 72 is formed at a position which is open counterclockwise through about 30° relative to the angular reference (See FIG. 1). The part of the outermost circumference of the rotation portion 70 which is not formed with the intermittent teeth 72 has an arcuate configuration.

The constant engagement teeth 73 are utilized for inputting the driving force of the drive motor 5 transmitted through the speed reduction mechanism 6 into the crank arm 7. As shown in FIG. 5, the constant engagement teeth 73 are provided on the lower surface of the rotation portion 70 so as to form a stepped portion with the intermittent teeth 72 in the direction of-the rotation axis. The constant engagement teeth 73 are smaller in wheel diameter than the intermittent teeth 72. It is to be noted that, in FIG. 5, the lower surface of the rotation portion 70 is oriented upward for convenience of illustration.

The constant engagement teeth 73 and the gear 61 of the speed reduction mechanism 6 constantly mesh with each other. The crank arm 7 rotates due to the transmission of the rotational force from the drive motor 5 to the constant engagement teeth 73 via the speed reduction mechanism 6.

As noted above, the first through the third ribs 74-76 serve to set the ON/Off state of the microswitches 94-96 in accordance with the rotational position of the crank arm 7. As shown in FIGS. 5-7, the first through the third ribs 74-76 are formed on the surface of the rotation portion 70 of the crank arm 7 which is opposite to the surface on which the arm portion 71 is provided, i.e. the lower surface of the gear member formed with the constant engagement teeth 73.

The cylindrical cam 8 pivots by a predetermined amount due to the driving force of the drive motor 5 transmitted via the crank arm 7 to move up and down the longitudinal front end of the pick-up unit 3 (lower end in FIG. 1).

The cylindrical cam 8 is positioned between the pick-up unit 3 and the crank arm 7 to be rotatable within a horizontal plane and includes the outer circumferential groove 80, the outer circumferential teeth 81, and outer circumferential recesses 82 and 83. The outer circumferential groove 80 serves to move up and down the front end of the pick-up unit 3 by utilizing the rotation of the cylindrical cam 8. As shown in FIGS. 3 and 4, the outer circumferential groove 80 is formed at a part of the outer circumferential surface of the cylindrical cam 8 as inclined with respect to the vertical. The pin 34 of the pick-up unit 3 is received in the outer circumferential groove 80. When the cylindrical cam 8 rotates, the pin 34 moves along the outer circumferential groove 80, whereby the front end of the pick-up unit 3 moves up and down. The outer circumferential teeth 81 are formed on the outer circumferential surface of the cylindrical cam 8 at a position opposite to the outer circumferential groove 80. The cylindrical cam 8 rotates due to the meshing of the outer circumferential teeth 81 with the intermittent teeth 72 when the arm portion 71 of the crank arm 7 moves near the rotation reference position S0.

The outer circumferential recesses 82 and 83 are defined by inwardly curved surfaces respectively formed continuously to opposite ends of the outer circumferential teeth 81. The curved surfaces of the outer circumferential recesses 82 and 83 generally conform to the curved surface of the outermost circumference (which includes the intermittent teeth 72) of the rotation portion 70 of the crank arm 7. The curved surfaces of the outer circumferential recesses 82 and 83 are so configured that, when the crank arm 7 comes to a position where the intermittent teeth 72 disengage from the outer circumferential teeth 81, the crank arm 7 slips on the cylindrical cam 8. Therefore, the cylindrical cam 8 rotates only when the outer circumferential teeth 81 mesh with the intermittent teeth 72 and is kept stationary during other periods, whereby the intermittent movement of the cylindrical cam 8 is realized.

Next, the detection of the position of the tray 1 will be described.

The crank arm 7 is rotatable within the angular rage of about ±160° from the rotation reference position S0. By the rotation of the crank arm 7, the tray 1 moves into and out of the housing and the pick-up unit 3 moves up and down via the cylindrical cam 8. As noted above, the angular range of the crank arm 7 in which the tray 1 moves in and out differs from the angular range of the crank arm 7 in which the pick-up unit 3 moves up and down. Thus, the rotational position of the crank arm 7 (specifically, the rotational position of the arm portion 71 from the rotation reference position S0) is related with the state of the tray 1 and the pick-up unit 3. In this embodiment, therefore, by detecting the rotational position of the crank arm 7 by utilizing the three microswitches 94-96 and the first through the three ribs 74-76, the seven states determined by the relationship between the state of the tray 1 and the state of the pick-up unit 3 are detected.

Specifically, there are four states of the tray 1, which are (1) the state in which the tray is stopped at the open stop position, (2) the state in which the tray is stopped at the close stop position, (3) the state in which the tray 1 is moving between the open stop position and the close stop position while the pick-up unit 3 is not clamping a disc, and (4) the state in which the tray 1 is moving between the open stop position and the close stop position while the pick-up unit 3 is clamping a disc. On the other hand, there are three states of the pick-up unit 3, which are (5) the state in which the pick-up unit is not clamping a disc (pick-up unit 3 is lowered), (6) the state in which the pick-up unit is performing the disc clamp operation (the pick-up unit 3 is moving upward), and (7) the state in which the pick-up unit is clamping a disc (pick-up unit 3 is lifted).

When the above states are considered in relation to the rotational position of the crank arm 7, the state (1) corresponds to the state in which the crank arm 7 is stopped at the position $+\theta$ or the position $-\theta$, whereas the state (2) corresponds to the state in which the distal end 71a of the arm portion 71 of the crank arm 7 is positioned within the intermediate curve 110 of the guide groove 100. In FIG. 1, provided that the angles at which the distal end 71a of the arm portion 71 is positioned at opposite ends of the intermediate curve 110 of the guide groove 100 are defined as $\pm\alpha$ (about $\pm 18°$ in FIG. 1), the state (2) corresponds to the state in which the crank arm 7 is positioned in the angular range between $+\alpha$ and $-\alpha$. The state (3) corresponds to the state in which the crank arm 7 is positioned in the angular range between $+\theta$ and $+\alpha$ (the distal end 71a is moving through the left end curve 120 of the guide groove 100). The state (4) corresponds to the state in which the crank arm 7 is positioned in the angular range between $-\alpha$ and $-\theta$ (the distal end 71a is moving through the right end curve 130 of the guide groove 100).

The clamping of a disc by the pick-up unit 3 is started when the intermittent teeth 72 of the crank arm 7 starts to mesh with the outer circumferential teeth 81 of the cylindrical cam 8 and finished when the intermittent teeth 72 is disengaged from the outer circumferential teeth 81 of the cylindrical cam 8. The intermittent teeth 72 of the crank arm 7 starts to mesh with the outer circumferential teeth 81 of the cylindrical cam 8 when the arm portion 71 of the crank arm 7 comes to the rotational position of $+\alpha$, whereas the intermittent teeth 72 disengages from the outer circumferential teeth 81 of the cylindrical cam 8 when the arm portion 71 of the crank arm 7 comes to the rotational position of $-\alpha$. Therefore, the state (5) corresponds to the state in which the crank arm 7 is positioned in the angular range between $+\theta$ and $+\alpha$ (similarly to the state (3)), the state (6) corresponds to the state in which the arm portion 71 of the crank arm 7 is positioned in the angular range between $+\alpha$ and $-\alpha$ (similarly to the state (2)), and the state (7) corresponds to the state in which the arm portion 71 of the crank arm 7 is positioned in the angular range between $-\alpha$ and $-\theta$ (similarly to the state (4)).

Thus, when the state in which the tray 1 is stopped at the open stop position is expressed as "open stop", the state in which the tray 1 is stopped at the close stop position as "close stop", the state in which tray is moving as "moving", the state in which the pick-up unit 3 is not clamping a disc as "CL off", the state in which the pick-up unit 3 is clamping a disc as "CL on", the state in which the pick-up unit is moving upward to clamp a disc as "moving up", the rotational positions of the crank arm 7 classified into seven based on the relationship between respective states of the tray 1 and the pick-up unit 3 are expressed as (the tray state, the pick-up unit state)=(open stop, CL off), (moving, CL off), (close stop, CL off), (close stop, moving up), (close stop, CL on), (moving, CL on) and (open stop, CL on).

The position (open stop, CL off) corresponds to the rotational position of +θ, the position (moving, CL off) corresponds to the angular range between +θ and +α, the position (close stop, CL off) corresponds to the rotational position of +α, the position (close stop, moving up) corresponds to the angular range between +α and −α, the position (close stop, CL on) corresponds to the rotational position of −α, the position (moving, CL on) corresponds to the angular range between −α and −θ, and the position (open stop, CL on) corresponds to the rotational position of −θ. Therefore, when the ON state and the OFF state of the microswitches 94-96 (SW94, SW95, SW96) are expressed as 1 and 0, respectively, the above-described seven positions of the crank arm 7 in this embodiment are detected by the following OF/OFF states of the three microswitches 94-96. It is to be noted that the following combinations of 0 and 1 as the detection information on the rotational position of the crank arm 7 are merely example and not limitative of the invention.

(1) Open stop position of +θ=(0, 0, 0)
(2) Angular range between +θ and +α=(1, 0, 0)
(3) Rotational position of +α=(1, 0, 1)
(4) Angular range between +α and −α=(0, 0, 1)
(5) Rotational position of −α=(0, 1, 1)
(6) Angular range between −α and −θ=(0, 1, 0)
(7) Open stop position of −θ=(1, 1, 0)

Therefore, the first through the third ribs 74-76 are formed into predetermined lengths at predetermined positions on the lower surface of the rotation portion 70 of the crank arm 7 so that the above-described ON/OFF states (1)-(7) of the microswitches 94-96 can be realized in accordance with the rotation of the crank arm 7.

Specifically, the first rib 74 is formed on the circumference of a largest circle, the second rib 75 is formed on the circumference of a middle circle, and the third rib 76 is formed on the circumference of a smallest circle. The first rib 74 is formed at two portions of the largest circumference. Each of the ribs 74-76 has opposite ends formed with slopes to reduce the shock caused by the contact of the lever of the corresponding microswitch 94-96 as a result of the relative movement of the microswitch due to the rotation of the crank arm 7.

As shown in FIG. 7, the crank arm 7 and the control board 9 are mounted to the housing so as to partially overlap each other. The first through the third microswitches 94-96 are provided at the portion of the control board 9 which overlaps the crank arm 7. Specifically, the first rib 74 is formed at a position corresponding to the first microswitch 94. When the crank arm 7 is positioned within the above-described angular range of (2), (3) and (7), the first rib 74 comes into contact with the first microswitch 94 to turn on the first microswitch 94. Similarly, the second rib 75 is formed at a position corresponding to the second microswitch 95. When the crank arm 7 is positioned within the above-described angular range of (5), (6) and (7), the second rib 75 comes into contact with the second microswitch 95 to turn on the second microswitch 95. The third rib 76 is formed at a position corresponding to the third microswitch 96. When the crank arm 7 is positioned within the above-described angular range of (3), (4) and (5), the third rib 76 comes into contact with the third microswitch 96 to turn on the third microswitch 96.

For example, FIGS. 7 and 8 show the state when the crank arm 7 is positioned within the angular range between +α and −α. In this state, only the third rib 76 comes into contact with the third microswitch 96, so that the ON/OFF states of the first through the third microswitches 94-96 become "OFF", "OFF" and "ON", respectively.

The detection signals indicating the ON/OFF states of the microswitches 94-96 are inputted into the microcomputer on the position of the crank arm 7, i.e., the state of the tray 1 and the pick-up unit 3 can be detected. Therefore, the microcomputer can always monitor the state of the tray 1 and the pick-up unit 3. Therefore, even when the operation of the tray 1 or the pick-up unit 3 is stopped by any failure, for example, the tray and the pick-up unit can be reliably returned to the original state or the initial state after the failure is recovered.

The operation will be described below.

Hereinafter, description will be given individually as to the seven operational states realized by the rotation of the arm portion 71 of the crank arm 7 to the above-described seven rotational positions. Specifically, the description will be given as to the state at each position in the case where the crank arm 7 is rotated clockwise from the open stop position of +θ to the open stop position of −θ. Since the operation in the case where the crank arm 7 is rotated counterclockwise from the open stop position of −θ to the open stop position of +θ is just the opposite, the description thereof is omitted.

FIGS. 11-28 are views for describing the operation. FIGS. 11-19 show the state (disc is not clamped) in which the front end of the pick-up unit 3 is positioned at the lowermost position (clamp release position), whereas FIGS. 20-28 show the state (disc is clamped) in which the front end of the pick-up unit 3 is positioned at the uppermost position (clamp position).

Figure 11:
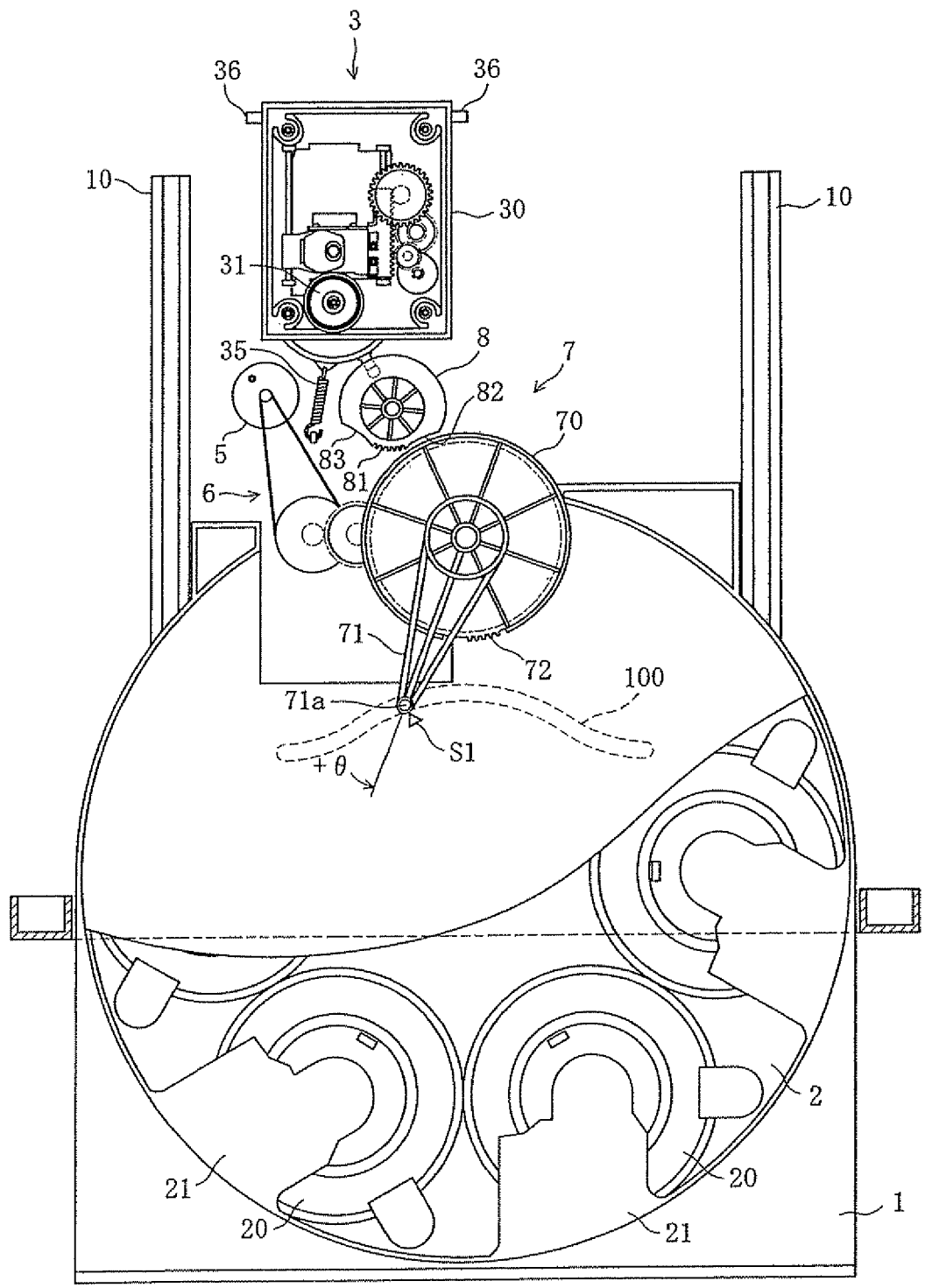
FIG. 11 is a plan view for describing a first operational state.
Figure 12:
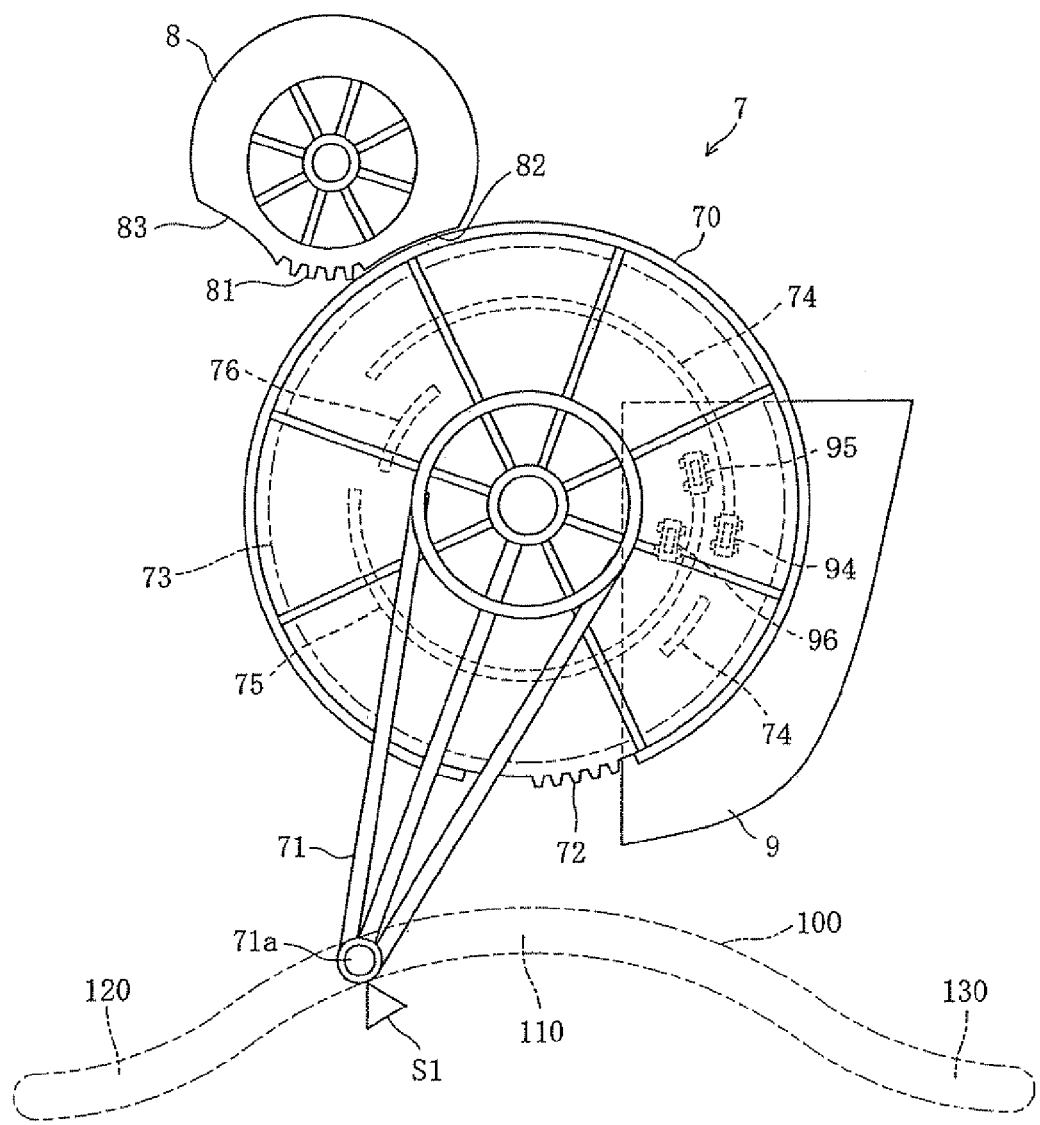
FIG. 12 is a plan view showing the relationship between the crank arm, the guide groove and the cylindrical cam in the first operational state.
Figure 13:
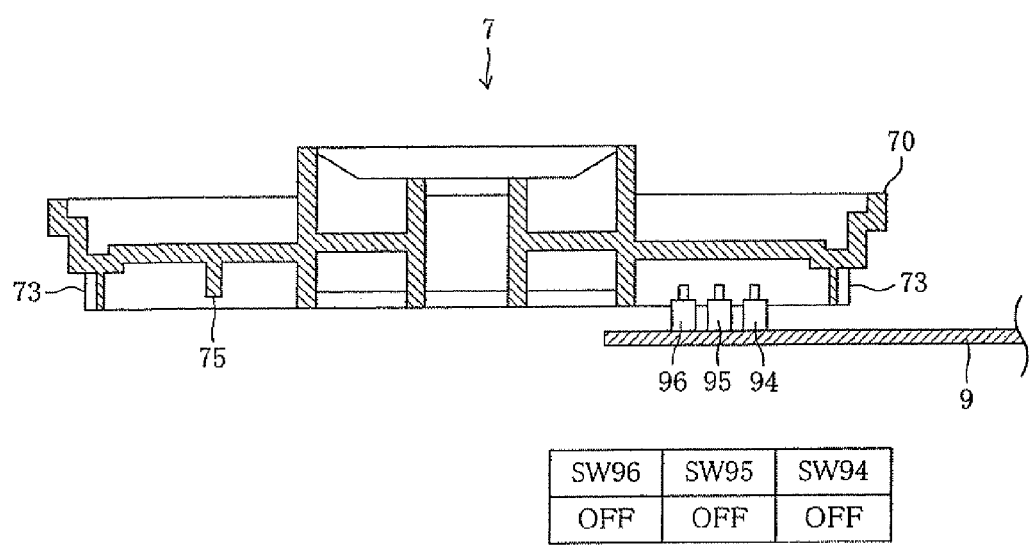
FIG. 13 is a sectional view corresponding to FIG. 8, showing the states of three switches in the first operational state.
Figure 14:
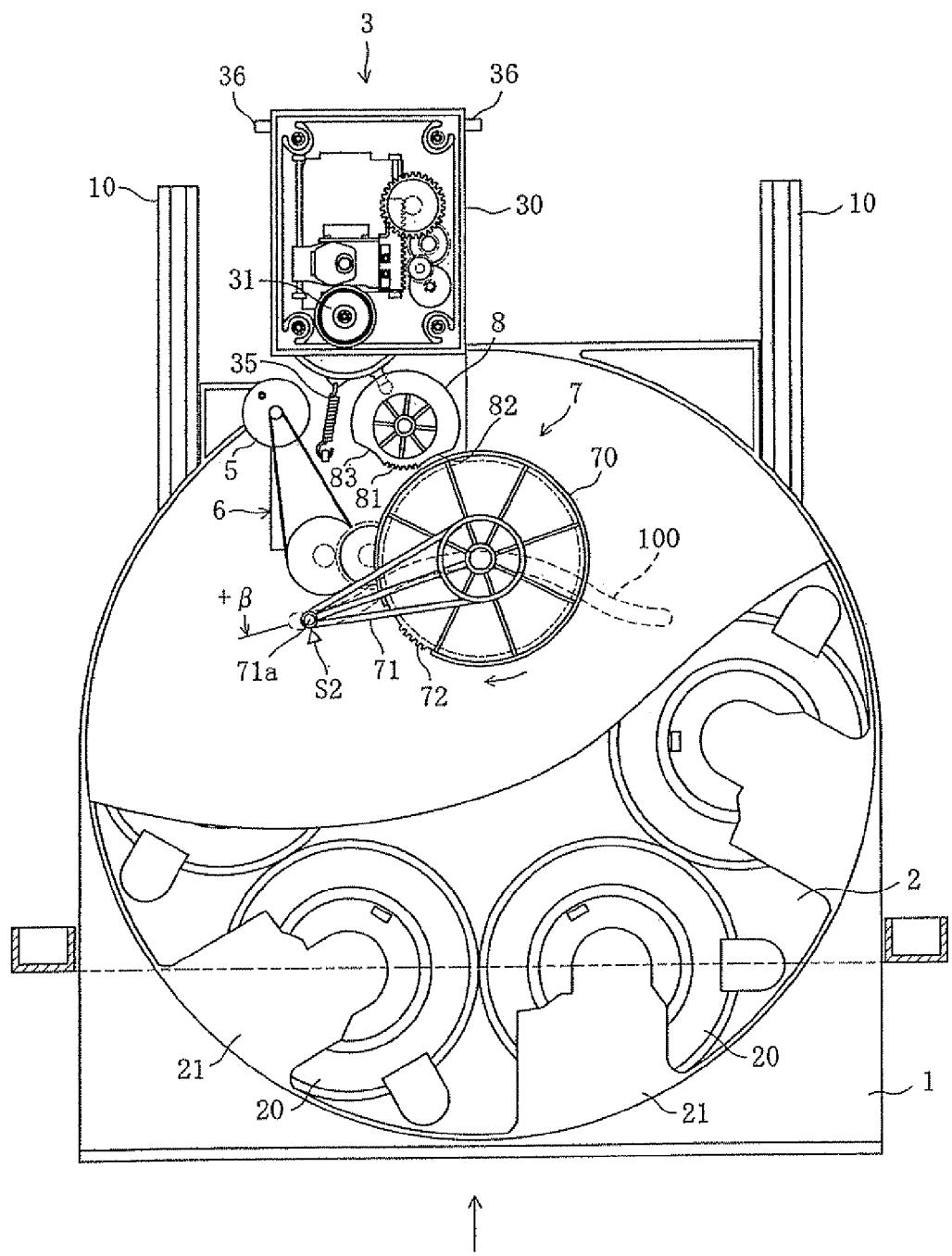
FIG. 14 is a plan view for describing a second operational state.
Figure 15:
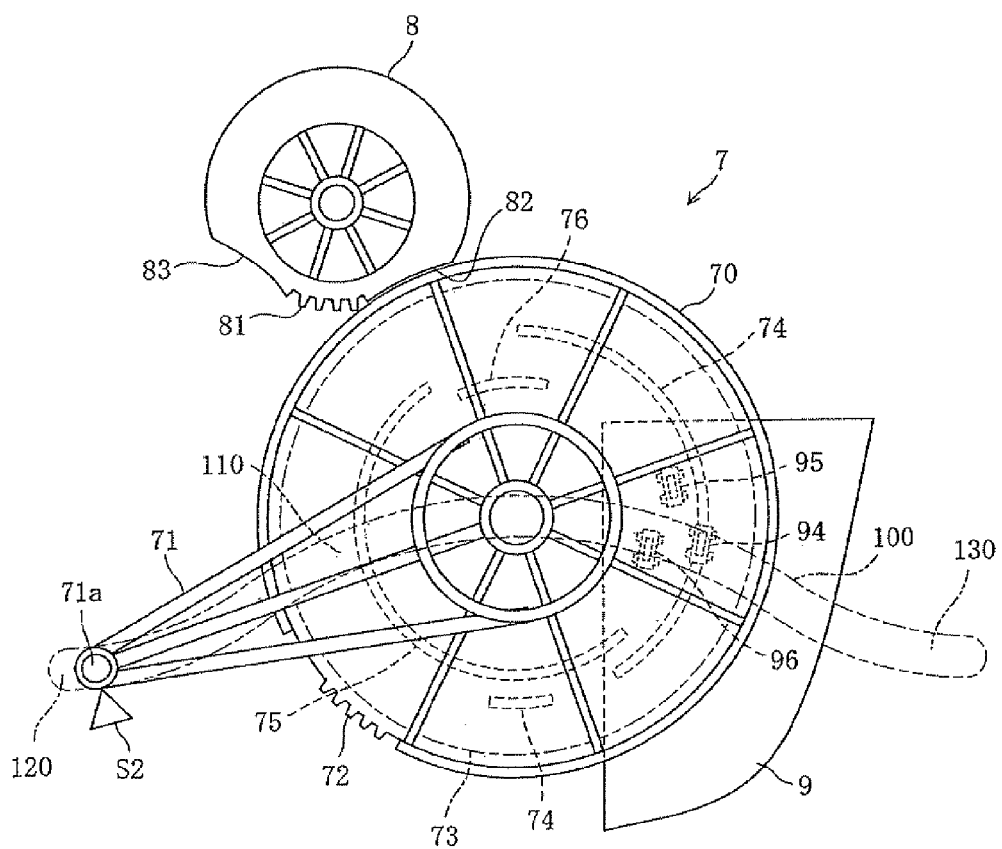
FIG. 15 is a plan view showing the relationship between the crank arm, the guide groove and the cylindrical cam in the second operational state.
Figure 16:
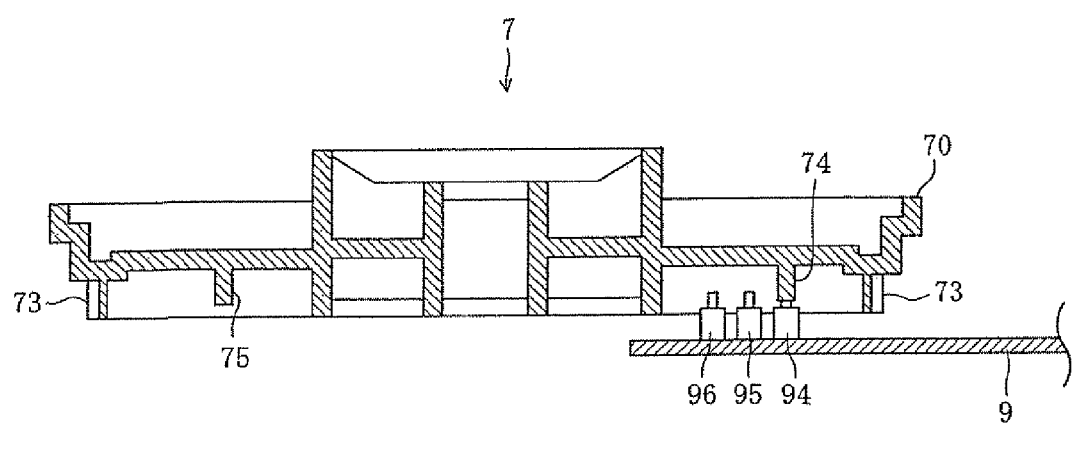
FIG. 16 is a sectional view corresponding to FIG. 8, showing the states of three switches in the second operational state.
Figure 17:
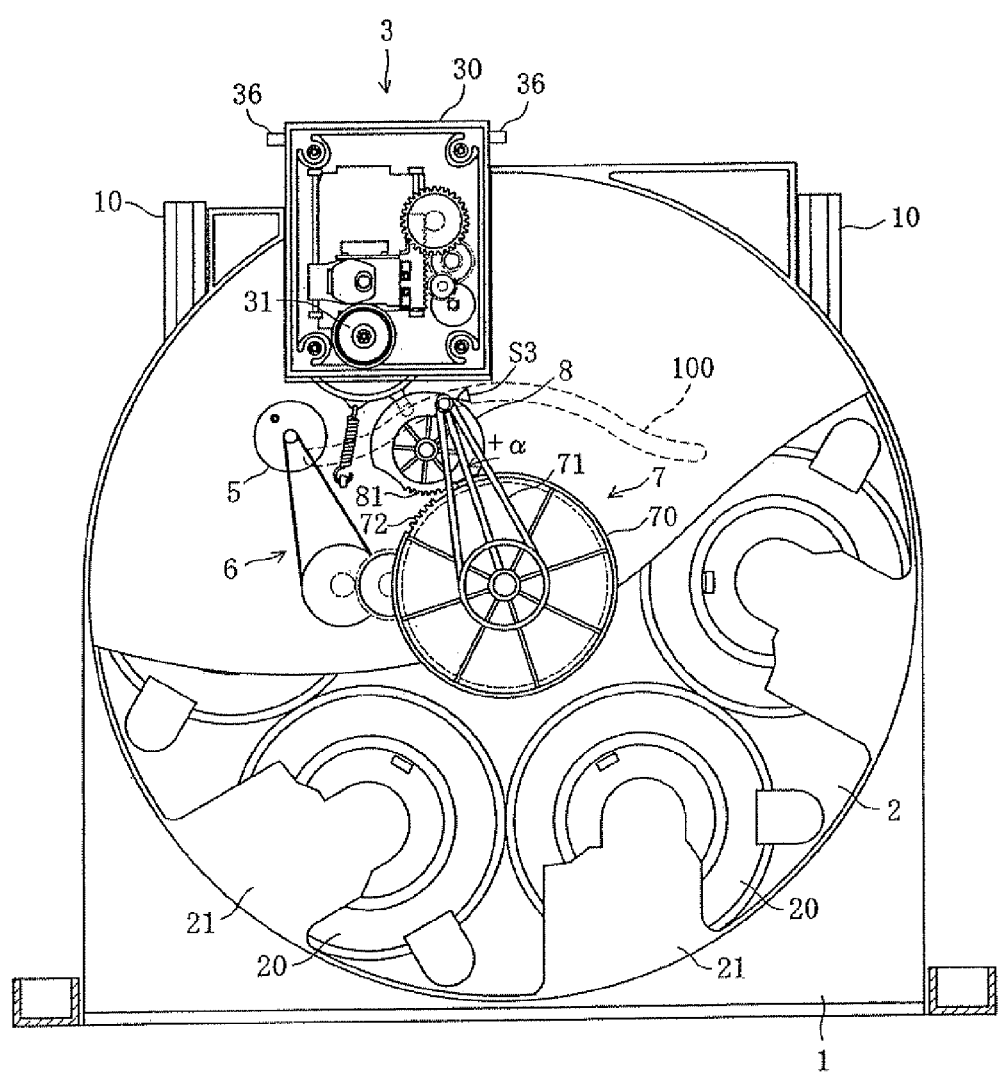
FIG. 17 is a plan view for describing a third operational state.
Figure 18:
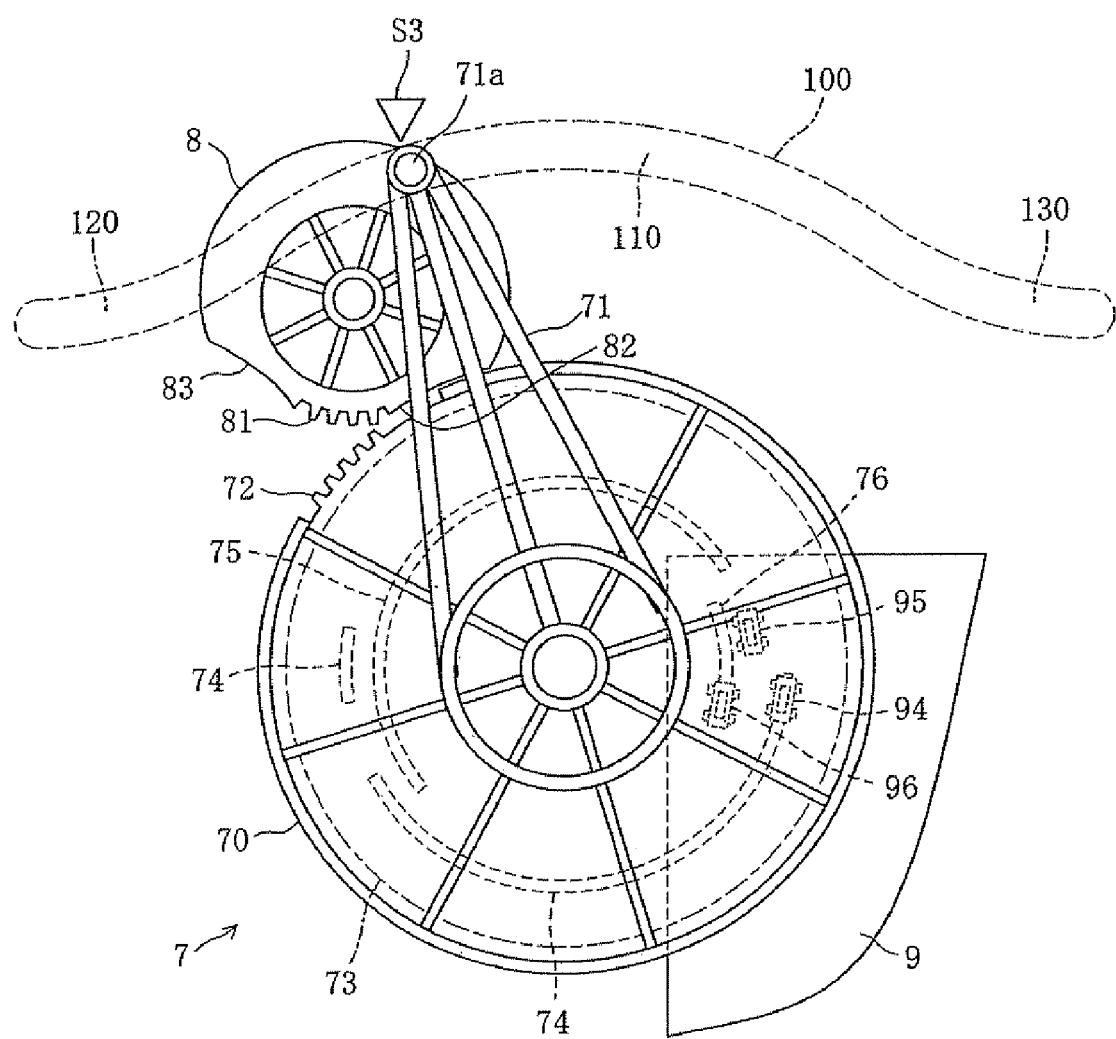
FIG. 18 is a plan view showing the relationship between the crank arm, the guide groove and the cylindrical cam in the third operational state.
Figure 19:
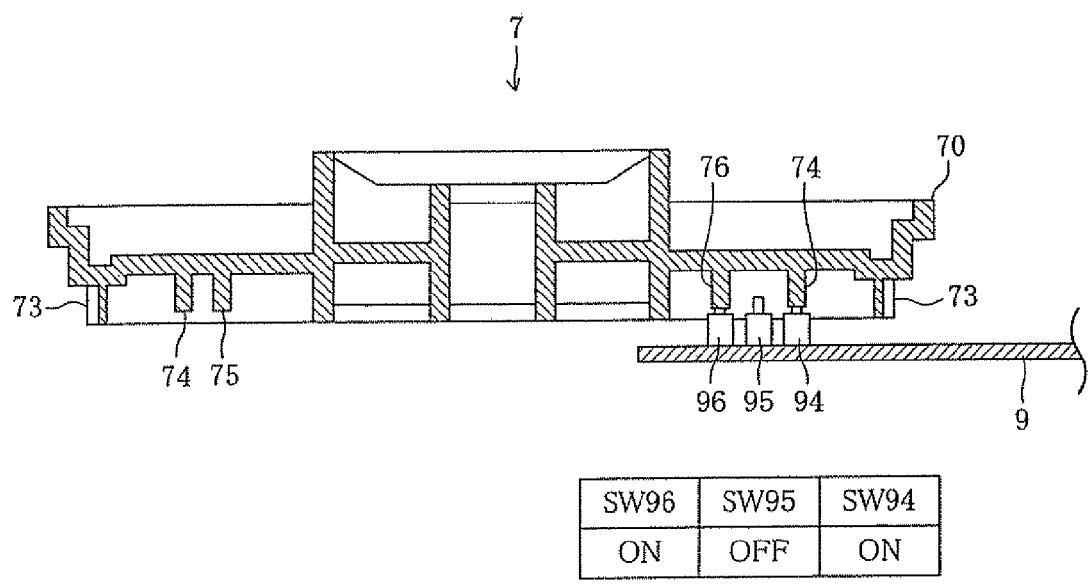
FIG. 19 is a sectional view corresponding to FIG. 8, showing the states of three switches in the third operational state.
Figure 20:
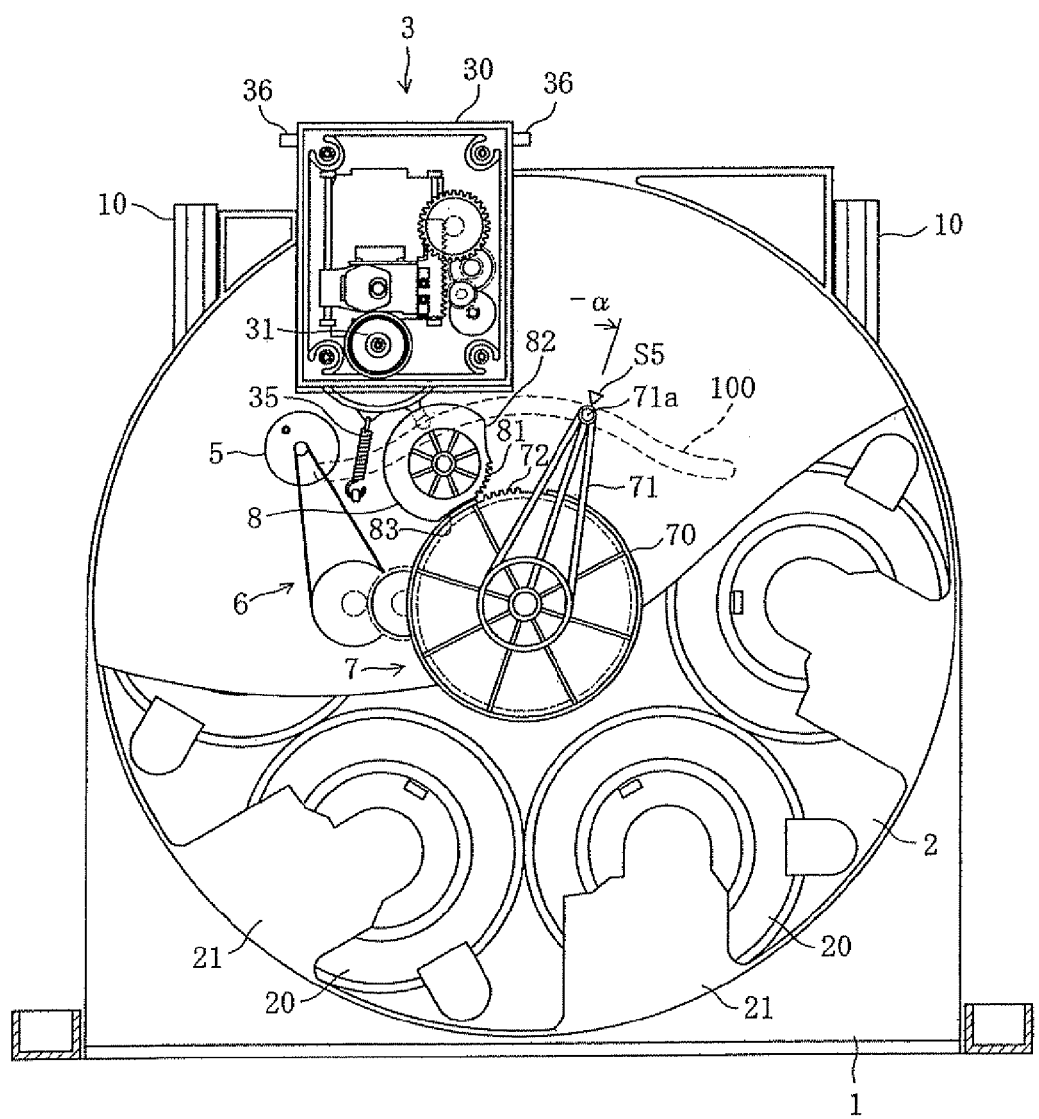
FIG. 20 is a plan view for describing a fifth operational state.
Figure 21:
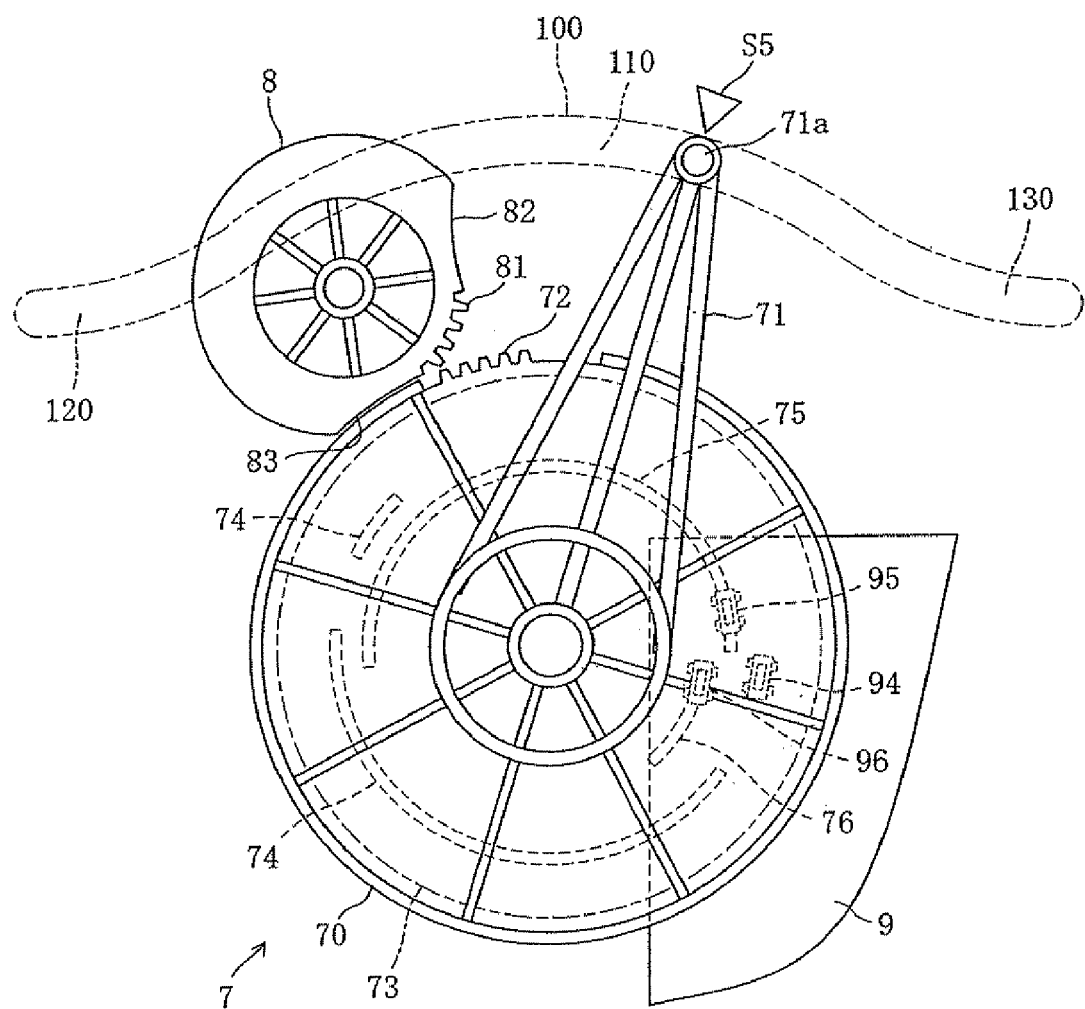
FIG. 21 is a plan view showing the relationship between the crank arm, the guide groove and the cylindrical cam in the fifth operational state.
Figure 22:
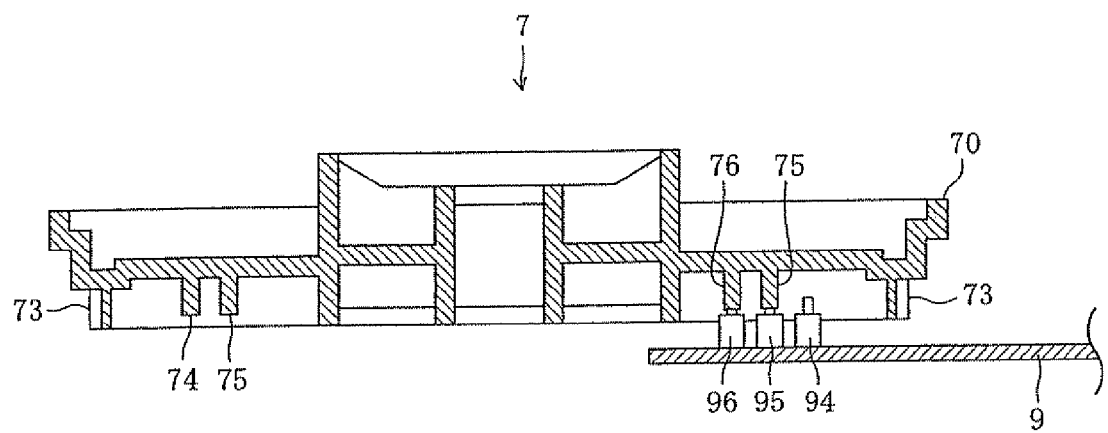
FIG. 22 is a sectional view corresponding to FIG. 8, showing the states of three switches in the fifth operational state.
Figure 23:
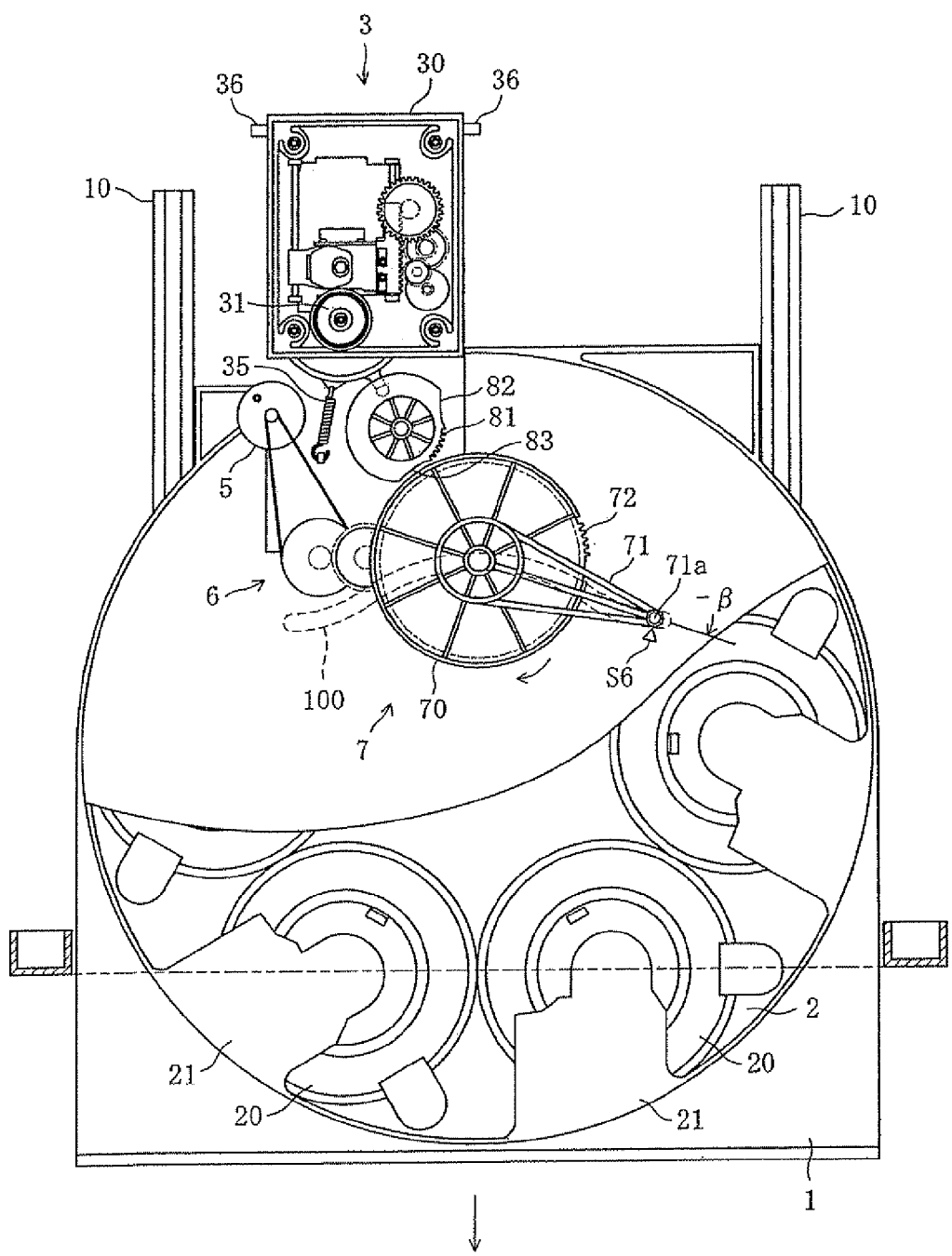
FIG. 23 is a plan view for describing a sixth operational state.
Figure 24:
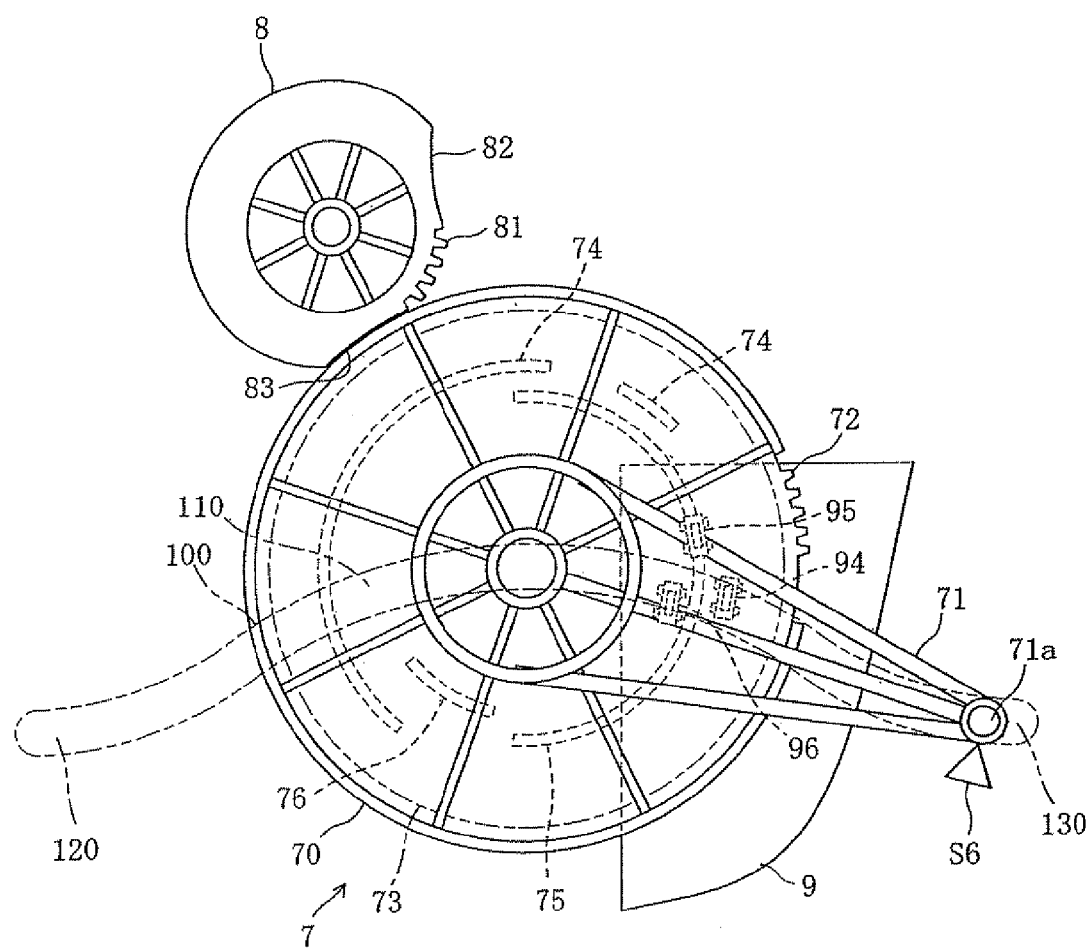
FIG. 24 is a plan view showing the relationship between the crank arm, the guide groove and the cylindrical cam in the sixth operational state.
Figure 25:
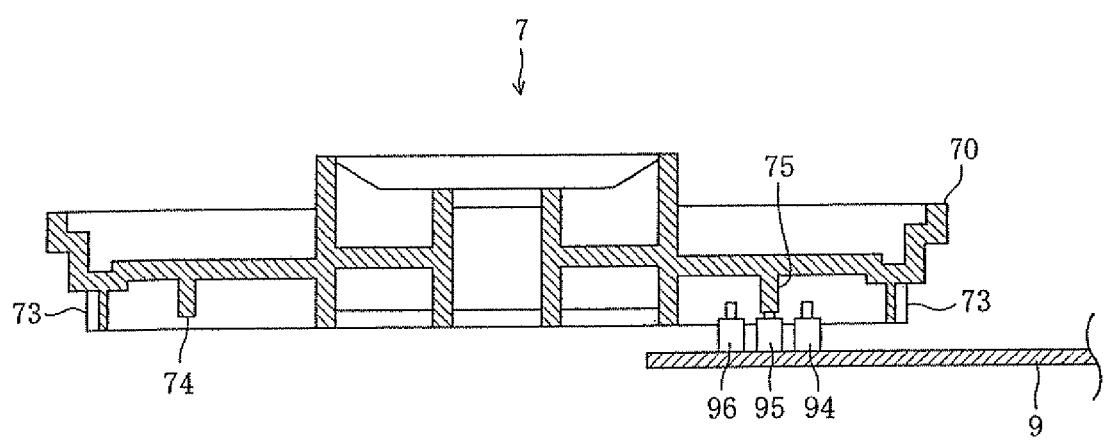
FIG. 25 is a sectional view corresponding to FIG. 8, showing the states of three switches in the sixth operational state.
Figure 26:
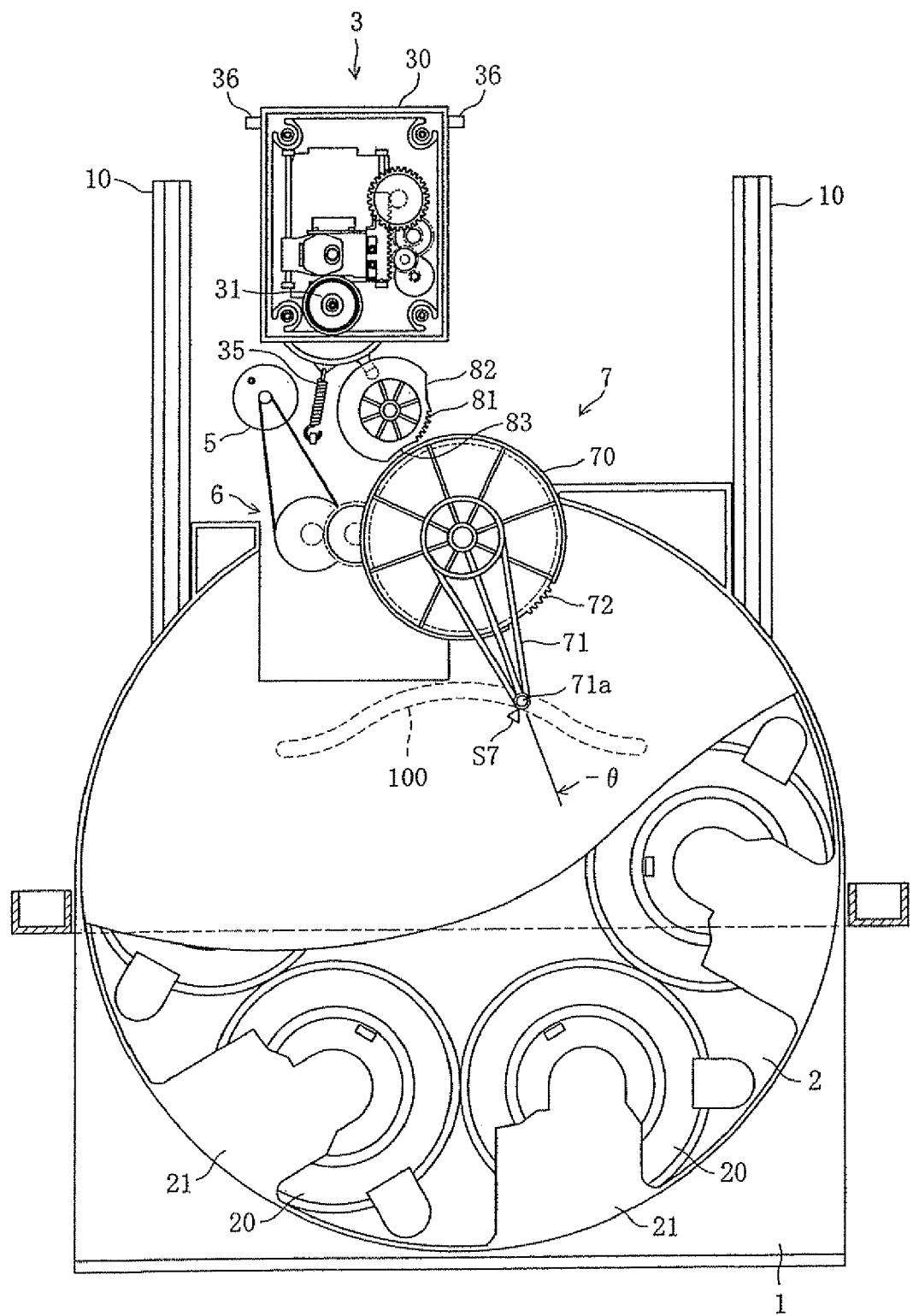
FIG. 26 is a plan view for describing a seventh operational state.
Figure 27:
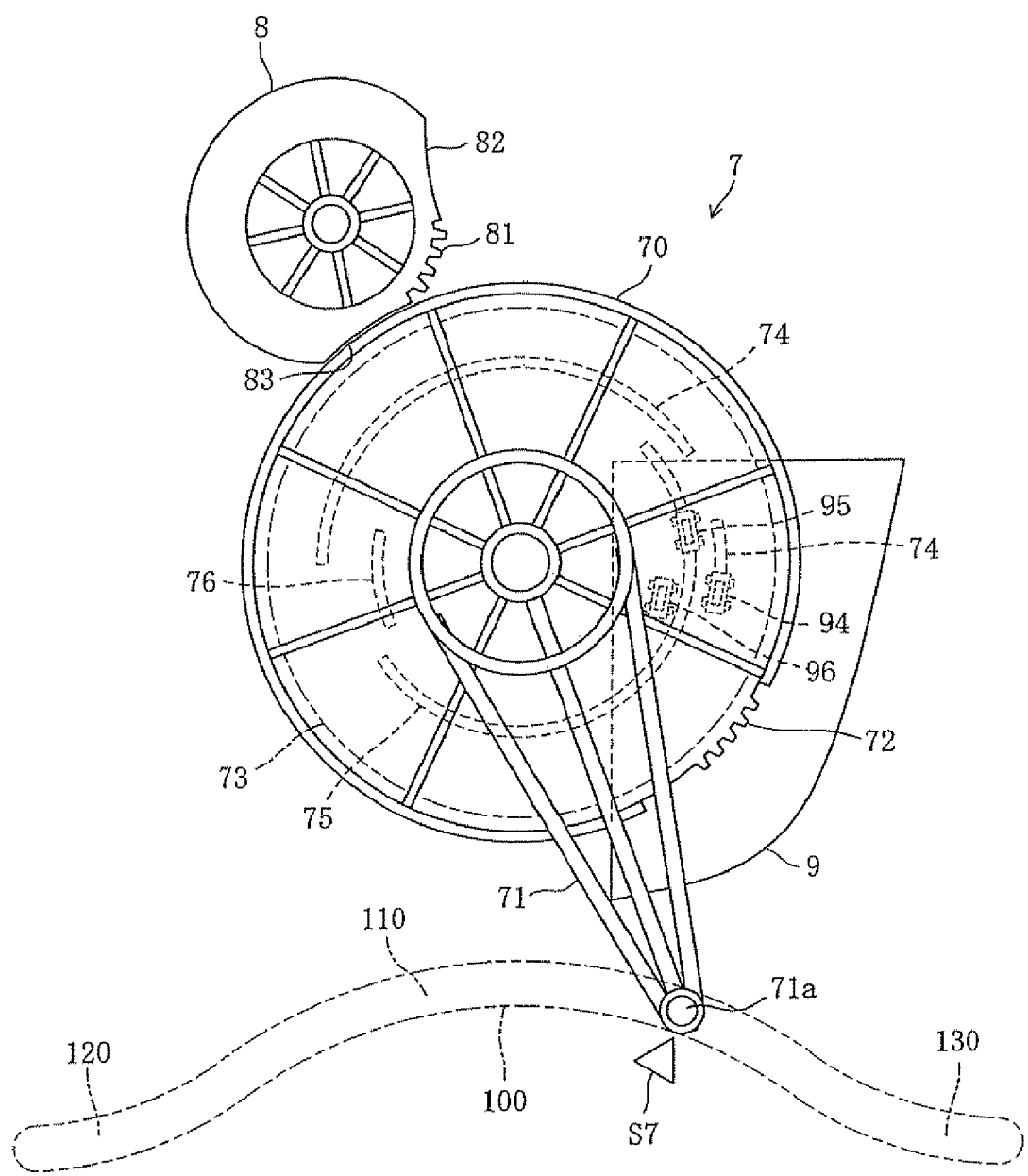
FIG. 27 is a plan view showing the relationship between the crank arm, the guide groove and the cylindrical cam in the seventh operational state.
Figure 28:
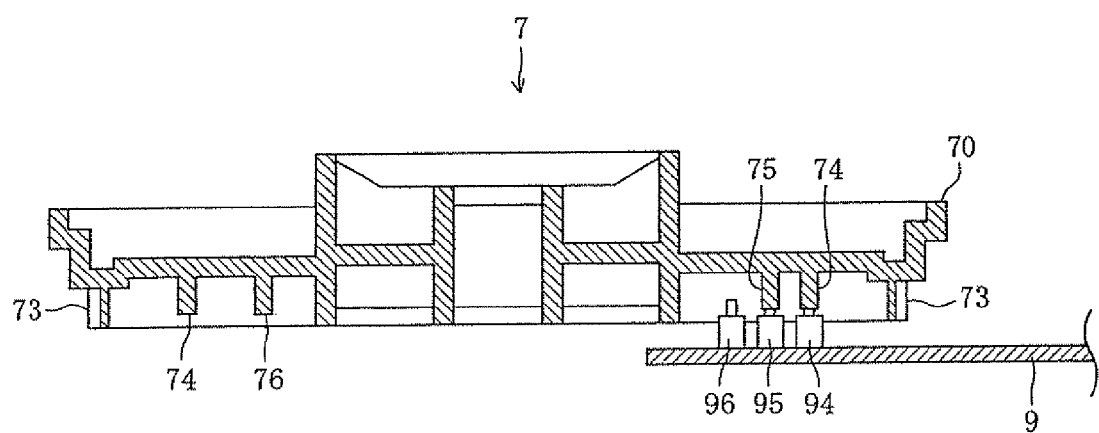
FIG. 28 is a sectional view corresponding to FIG. 8, showing the states of three switches in the seventh operational state.
Figure 29:
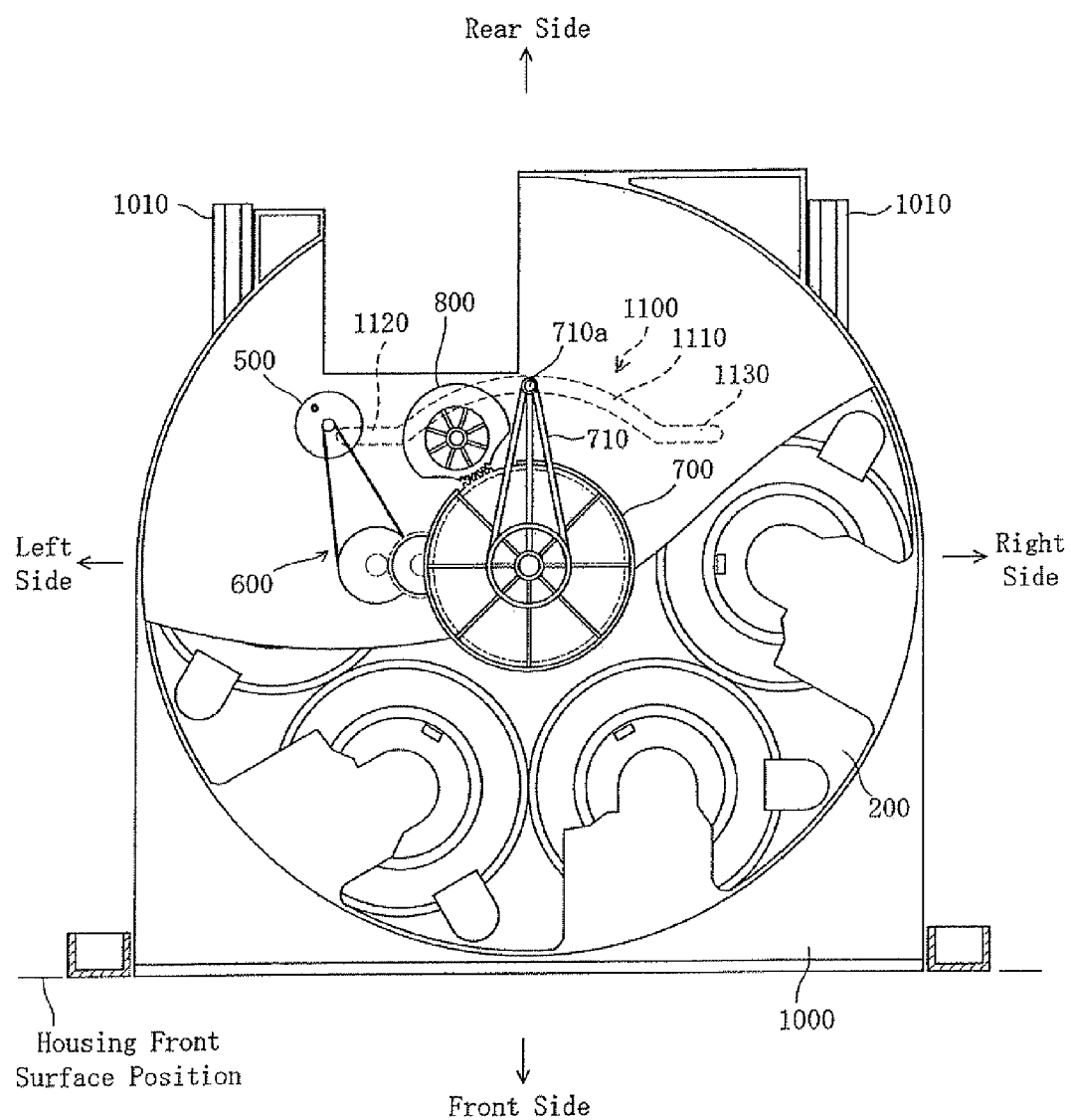
FIG. 29 is a top view showing the driving mechanism for a tray and a pick-up unit of a conventional disc changer.

FIGS. 11-13 show the state in which the tray 1 is held at the open stop position of +θ (first operational state, See the state (1)), FIGS. 14-16 show the state in which the tray 1 is moving from the open stop position to the close stop position with the pick-up unit 3 held at the clamp release position (second operational state, See the state (2)), and FIGS. 17-19 show the state in which the tray 1 is held at the close stop position (third operational state, See the state (3)). The operational state (fourth operational state, See the state (4)) in which the tray 1 is held at the close stop position while the pick-up unit 3 is moving up and down will be described with reference to FIGS. 1, 7 and 8. FIGS. 20-22 show the state in which the tray 1 is held at the close stop position (fifth operational state, See the state (5)). FIGS. 23-25 show the state in which tray 1 is moving from the close stop position to the open stop position with the pick-up unit 3 held at the clamp position, (sixth operational state, See the state (6)). FIGS. 26-28 show the state in which the tray 1 is held at the open stop position of −θ (seventh operational state, See the state (7)).

[First Operational State] (See FIGS. 11-13)

The first operational state is a state in which, with no disc being played, the tray 1 is pulled out from the housing for mounting a disc to be played to the roulette table 2 or exchanging discs. In the first operational state, the user can mount a disc to or remove a disc from the mount portion 20 of the roulette table 2 which is pulled out from the housing together with the tray 1. By rotating the roulette table 2, the mount portion 20 positioned deep in the housing can be moved to the outside of the housing, so that all of the six discs can be exchanged.

In the first operational state, the arm portion 71 of the crank arm 7 is in the state rotated counterclockwise through the rotational angle of about +θ (about +160° in FIGS. 11 and 12) from the rotation reference position S0. When the crank arm 7 rotates counterclockwise from the rotation reference position S0, the distal end 71a of the arm 71 moves from the center of the intermediate curve 110 toward the left end curve 120 of the guide groove 100 of the tray 1. During when the distal end 71a of the arm portion 71 moves through the intermediate curve 110 of the guide groove 100, the intermittent teeth 72 of the crank arm 7 mesh with the outer circumferential teeth 81, whereby the cylindrical cam 8 rotates clockwise in accordance with the rotation of the crank arm 7 to lower the front end of the pick-up unit 3. In this way, the pick-up unit 3 is set to the clamp release position.

When the distal end 71a of the arm portion 71 moves from the intermediate curve 110 to the left end curve 120 of the guide grove 100, the intermittent teeth 72 of the crank arm 7 disengage from the outer circumferential teeth 81. Thereafter, when the distal end 71a of the arm portion 71 moves through the left end curve 120, the rotational force of the crank arm 7 is transmitted to the tray 1 only, whereby the tray 1 moves from the closed stop position toward the open stop position. By this movement of the tray 1, the guide groove 100 moves toward the front relative to the crank arm 7. As shown in FIG. 11, when the distal end 71a of the arm portion 71 comes to a first rotational position S1 slightly deviated to the left within the intermediate curve 110 of the guide groove 100 (the position which forms the rotational angle of about +θ from the rotation reference position S0), the rotation of the crank arm 7 is stopped. Therefore, when the distal end 71a of the arm portion 71 is positioned at the first rotational position S1, the tray 1 is positioned at the open stop position for exchanging discs with no disc being played.

As shown in FIGS. 12 and 13, in the first operational state, all of the first through the third ribs 74-76 are located at positions for avoiding contact with the first through the third microswitches 94-96. Therefore, all of the first through the third microswitches 94-96 are kept "OFF". From such a state of the switches, the microcomputer determines that the tray 1 and the pick-up unit 3 are in the first operational state. Specifically, from the states of the first through the third microswitches 94-96 all of which are "OFF", it is determined that the tray 1 is at the open stop position for exchanging discs with no disc being played.

[Second Operational State] (See FIGS. 14-16)

The second operational state is a state in which, with no disc being played, the tray which has once pulled out from the housing is moved to be accommodated into the housing for accommodation of the discs. Specifically, when a non-illustrated eject switch, for example, is operated after discs are mounted to the roulette table 2 in the first operational state, the crank arm 7 is rotated clockwise through a predetermined angle of (θ-α), whereby the first operational state shifts to the second operational state. At this time, the distal end 71a of the arm portion 71 moves from the first rotational position S1 in the intermediate curve 110 of the guide groove 100 toward the left end curve 120. During when the distal end 71a of the arm portion 71 moves through the left end curve 120, the rotational force of the crank arm 7 is transmitted to the tray 1 only, whereby the tray 1 moves from the open stop position toward the close stop position. In the rotation, the distal end 71a of the arm portion 71 passes through a second rotational position S2 which forms the rotational angle of +β (about +108° in FIGS. 14 and 15) from the rotational reference position S0.

Since the left end curve 120 is gently arcuate, as the distal end 71a of the arm portion 71 moves to the left end curve 120 and further moves toward the left, the force transmitted from the crank arm 7 to the tray 1 as converted into the straight movement force gradually increases. Therefore, the tray 1 starts the closing movement slowly, and the speed of the movement increases gradually. When the distal end 71a of the arm portion 71 turns back at the end of the left end curve 120 and passes through the second rotational position S2, the force transmitted from the crank arm 7 to the tray 1 gradually decreases as the distal end of the arm portion moves toward the intermediate curve 110. In this way, the tray 1 moves to the close stop position while decreasing the speed of the movement.

In the second operational state, the intermittent teeth 72 of the crank arm 7 do not mesh with the outer circumferential teeth 81, so that the rotation portion 70 of the crank arm 7 slips on the cylindrical cam 8. Therefore, the pick-up unit 3 is held at the clamp release position.

As shown in FIGS. 15 and 16, in the second operational state, only the first rib 74 comes into contact with the first microswitch 94, whereas the second and the third ribs 75 and 76 are located at positions for avoiding contact with the second and the third microswitches 95 and 96, respectively. Therefore, only the first microswitch 94 is kept "ON", whereas the second and the third microswitches 95 and 96 are kept "OFF". From such a state of the switches, the microcomputer determines that the tray 1 and the pick-up unit 3 are in the second operational state. Specifically, from the states of the first through the third microswitches 94-96 which are "ON", "OFF" and "OFF", respectively, it is determined that the tray 1 is moving from the open stop position for exchanging discs to be played to the close stop position, with no disc being played.

[The third Operational State] (See FIGS. 17-19)

The third operational state is a state in which the tray 1 is completely accommodated in the housing. In the third operational state, the distal end 71a of the arm portion 71 is held at a third rotational position S3, which forms a rotational angle of +α (about +18° in FIGS. 17 and 18) from the rotation reference position S0, and the rotation of the crank arm 7 is stopped.

Immediately before the crank arm 7 stops, the distal end 71a of the arm portion 71 moves through the left end curve 120 of the guide groove 100 toward the intermediate curve 110. As noted above, since the left end curve 120 is gently arcuate, as the distal end 71a of the arm portion 71 moves through the left end curve 120 toward the intermediate curve 110, the force transmitted from the crank arm 7 to the tray 1 gradually reduces, so that the speed of the movement of the tray 1 is reduced. When the distal end 71a of the arm portion 71 moving from the left end curve 120 reaches the position slightly inside of the intermediate curve 110, the rotation center of the roulette table 2 of the tray 1 and the rotation center O of the crank arm 7 substantially correspond to each other, i.e., the rotation center of the arm portion 71 and the center of curvature of the intermediate curve 110 of the guide groove 100 substantially correspond to each other. As a result, the rotational force of the crank arm 7 is not transmitted to the tray 1, so that the tray 1 stops. Further, a stopper provided on the housing also hinders the movement of the tray 1 to stop the tray 1.

In the third operational state, the intermittent teeth 72 of the crank arm 7 is located at a position directly before meshing with the outer circumferential teeth 81 of the cylindrical cam 8 and is not meshing with the outer circumferential teeth 81. Therefore, the pick-up unit 3 is held at the clamp release position.

As shown in FIGS. 18 and 19, in the third operational state, the first and the third ribs 74 and 76 come into contact with the first and the third microswitches 94 and 96, respectively, whereas the second rib 75 is located at a position for avoiding contact with the second microswitch 95. Therefore, the first and the third microswitches 94 and 96 are kept "ON", whereas the second microswitch 95 is kept "OFF". From such a state of the switches, the microcomputer determines that the tray 1 and the pick-up unit 3 are in the third operational state. Specifically, from the states of the first through the third microswitches 94-96 which are "ON", "OFF" and "ON", respectively, it is determined that the tray 1 is stopped at the close stop position after moving from the open stop position for exchanging discs to be played, with no disc being played.

[Fourth Operation State] (See FIGS. 1, 7 and 8)

The fourth operational state is a state in which the pick-up unit 3 is moved up and down for clamping or releasing a disc in the housing. The fourth operation is not performed successively after the third operational state but performed after the user designates the disc to be played and that disc is transported to the predetermined clamp position by the rotation of the roulette table 2. When a disc is not played, the tray 1 is held at the close stop position, with the distal end 71a of the arm portion 71 located at the third rotational position S3. In this state, when the disc to be played is transported to the clamp position, the microcomputer rotates the crank arm 7 clockwise through a predetermined angle (2α) At this time, the distal end 71a of the crank arm 71 moves from left to right along the intermediate curve 110 of the guide groove 100 and passes through a fourth rotational position S4 which is the same position as the rotational reference position so.

During when the distal end 71a of the arm portion 71 moves through the intermediate curve 110 of the guide groove 100, the intermittent teeth 72 of the crank arm 7 mesh with the outer circumferential teeth 81. Therefore, the cylindrical cam 8 rotates counterclockwise in accordance with the rotation of the crank arm 7, whereby the front end of the pick-up unit 3 moves up. In this way, the pick-up unit 3 is set to the clamp position.

Due to the upward movement of the front end of the pick-up unit 3, the turntable 31 lifts the disc so that the disc is clamped by the turntable 31 and the rotating member 40 of the chucking cover 4. During this operation, the rotation center of the arm portion 71 corresponds to the center of curvature of the intermediate curve 110. Therefore, the rotational force of the crank arm 7 is not transmitted to the tray 1, so that the tray 1 is held at the close stop position.

As shown in FIGS. 7 and 8, in the fourth operational state, only the third rib 76 comes into contact with the third microswitch 96, whereas the first and the second ribs 74 and 75 are located at positions for avoiding contact with the first and the second microswitches 94 and 95, respectively. Therefore, the third microswitch 96 is kept "ON", whereas the first and the second microswitches 94 and 95 are kept "OFF". From such a state of the switches, the microcomputer determines that the tray 1 and the pick-up unit 3 are in the fourth operational state. Specifically, from the states of the first through the third microswitches 94-96 which are "OFF", "OFF" and "ON", respectively, it is determined that the tray 1 is located at the close stop position in the housing while the pick-up unit 3 is moving up and down to clamp or release a disc.

[Fifth Operational State] (See FIGS. 20-22)

The fifth operational state is a state in which, with the tray 1 completely accommodated in the housing, a disc clamped by the pick-up unit 3 is played or waits to be played. In the fourth operational state, when the distal end 71a of the arm portion 71 moving to the right through the intermediate curve 110 of the guide groove 100 comes to a fifth rotational position S5 within the intermediate curve 110 which forms the rotational angle of −α (about −18° in FIGS. 20 and 21) from the rotation reference position S0, the rotation of the crank arm 7 is stopped. During when the distal end 71a of the arm portion 70 moves through the intermediate curve 110 of the guide groove 100, the intermittent teeth 72 of the crank arm 7 mesh with the outer circumferential teeth 81, so that the cylindrical cam 8 rotates counterclockwise in accordance with the rotation of the crank arm 7. However, when the distal end 71a of the arm portion 71 comes to the fifth rotational position S5, the intermittent teeth 72 of the crank arm 7 disengage from the outer circumferential teeth 81, so that the rotation of the cylindrical cam 8 is stopped. As a result, the upward movement of the pick-up unit 3 is stopped. In this way, the pick-up unit 3 is set to the clamp position.

During when the distal end 71a of the arm portion 71 moves through the intermediate curve 110 of the guide groove 100, the rotational force of the crank arm 7 is not transmitted to the tray 1, so that the tray 1 is held at the close stop position.

As shown in FIGS. 21 and 22, in the fifth operational state, the second and the third ribs 75 and 76 come into contact with the second and the third microswitches 95 and 96, respectively, whereas the first rib 74 is located at a position for avoiding contact with the first microswitch 94. Therefore, the second and the third microswitches 95 and 96 are kept "ON", whereas the first microswitch 94 is kept "OFF". From such a state of the switches, the microcomputer determines that the tray 1 and the pick-up unit 3 are in the fifth operational state. Specifically, from the states of the first through the third microswitches 94-96 which are "OFF", "ON" and "ON", respectively, it is determined that the tray 1 is located at the close stop position within the housing while the pick-up unit 3 is held at the disc clamp position.

[Sixth Operational State] (See FIGS. 23-25)

The sixth operational state is a state in which, with the disc clamped by the pick-up unit 3 being played or waiting to be played, the tray 1 is being pulled out from the housing for exchanging other discs. The sixth operation is not performed successively after the fifth operational state but performed upon the user's operation of e.g. an eject switch during the playing of a disc. When the user operates e.g. an eject switch during the playing of a disc, the microcomputer rotates the crank arm 7 further clockwise through a predetermined angle (θ-α). Due to this rotation, the distal end 71a of the crank arm 7 moves from the fifth rotational position S5 in the intermediate curve 110 of the guide groove 100 to the right end curve 130. During when the distal end 71a of the arm portion 71 moves through the right end curve 130, the rotational force of the crank arm 7 is transmitted to the tray 1 only, so that the tray 1 moves from the close stop position toward the open stop position. During this rotation, the distal end 71a of the arm portion 71 passes through a sixth rotational position S6 which forms a rotational angle of −α (about −18° in FIGS. 23 and 24) from the rotation reference position S0.

Similarly to the left end curve 120, the right end curve 130 is also gently arcuate. Therefore, as the distal end 71a of the arm portion 71 moves to the right end curve 130 and further moves to the right, the force transmitted from the crank arm 7 to the tray 1 as converted into the straight movement force gradually increases. Therefore, the tray 1 starts the opening movement slowly, and the speed of the movement increases gradually. When the distal end 71a of the arm portion 71 turns back at the end of the right end curve 130 and passes through the sixth rotational position S6, the force transmitted from the crank arm 7 to the tray 1 gradually decreases as the distal end of the arm portion moves toward the intermediate curve 110. Therefore, the tray 1 moves to the open stop position while decreasing the speed of the movement.

In the sixth operational state, the intermittent teeth 72 of the crank arm 7 do not mesh with the outer circumferential teeth 81, so that the rotation portion 70 of the crank arm 7 slips on the cylindrical cam 8. Therefore, the pick-up unit 3 is held at the clamp position.

As shown in FIGS. 24 and 25, in the sixth operational state, only the second rib 75 comes into contact with the second microswitch 95, whereas the first and the third ribs 74 and 76 are located at positions for avoiding contact with the first and the third microswitches 94 and 96, respectively. Therefore, the second microswitch 95 is kept "ON", whereas the first and the third microswitches 94 and 96 are kept "OFF". From such a state of the switches, the microcomputer determines that the tray 1 and the pick-up unit 3 are in the sixth operational state. Specifically, from the states of the first through the third microswitches 94-96 which are "OFF", "ON" and "OFF", respectively, it is determined that the pick-up unit 3 is holding a disc for rotation for playing while the tray 1 is moving between the close stop position and the open stop position.

[Seventh Operational State] (See FIGS. 26-28)

The seventh operational state is a state in which, with a disc being played or waiting to be played, the tray 1 is pulled out from the housing for exchanging other discs. Even during the playing of a disc within the housing, the user can mount a disc to the mount portion 20 or remove a disc from the mount portion 20 of the roulette table 2 which is pulled out from the housing along with the tray 1.

In the seventh operational state, the arm portion 71 of the crank arm 7 is in the state rotated clockwise through the rotational angle of about −θ (about −160° in FIGS. 11 and 12) from the rotation reference position S0. When the crank arm 7 rotates clockwise, the distal end 71a of the arm portion 71 moves from the sixth rotational position S6 in the guide groove 100 of the tray 1 toward the right end curve 130. During when the distal end 71a of the arm portion 71 moves through the right end curve 130, the rotational force of the crank arm 7 is transmitted to the tray 1 only, so that the tray 1 moves from the close stop position toward the open stop position. By this movement of the tray 1, the guide groove 100 moves toward the front relative to the crank arm 7. As shown in FIG. 27, when the distal end 71a of the arm portion 71 comes to a seventh rotational position S7 slightly deviated to the right within the intermediate curve 110 of the guide groove 100 (the position which forms the rotational angle of about −θ from the rotation reference position S0), the rotation of the crank arm 7 is stopped. Therefore, when the distal end 71a of the arm portion 71 is located at the seventh rotational position S7, the tray 1 is positioned at the open stop position for mounting a disc or exchanging discs while playing a disc.

During when the distal end 71a of the arm portion 71 moves from the sixth rotational position S6 to the seventh rotational position S7, the intermittent teeth 72 of the crank arm 7 do not mesh with the outer circumferential teeth 81, so that the pick-up unit 3 is held at the clamp position.

As shown in FIGS. 27 and 28, in the seventh operational state, the first and the second ribs 74 and 75 come into contact with the first and the second microswitches 94 and 95, respectively, whereas the third rib 76 is located at a position for avoiding contact with the third microswitch 96. Therefore, the first and the second microswitches 94 and 95 are kept "ON", whereas the third microswitch 96 is kept "OFF". From such a state of the switches, the microcomputer determines that the tray 1 and the pick-up unit 3 are in the seventh operational state. Specifically, from the states of the first through the third microswitches 94-96 which are "ON", "ON" and "OFF", respectively, it is determined that the tray 1 is located at the open stop position for mounting a disc or exchanging discs while playing another disc.

As described above, the first through the seventh operational states are successively realized by rotating the crank arm 7 clockwise from the state in which the distal end 71a of the arm portion 71 is located at the first rotational position S1. However, the above seven states may be realized in the reverse order by rotating the crank arm 7 counterclockwise. For example, if the crank arm 7 is rotated counterclockwise within the angular range of ±θ from the state in which the distal end 71a of the arm portion 71 is located at the seventh rotational position S7, the seventh operational state can be smoothly shifted to the first operational state through the intermediate states.

In any of the first through the seventh operational states, the entire operation may be stopped by the intentional turning-off of the power by the user or due to a power failure. Even in such a case, when the power is turned on again, it is possible to detect the rotational position of the crank arm 7, i.e., the state of the tray 1 and the pick-up unit 3 based on the ON/OFF information of the first through the third microswitches 94-96. Therefore, the tray 1 and the pick-up unit 3 can be immediately set to a predetermined state which may be the third operational state, for example.

Specifically, for example, in the case where the power is turned off in the second operational state and thereafter turned on again, the first through the third microswitches 94, 95 and 96 are in the ON state, the OFF state and the OFF state, respectively. Based on such ON/OFF information, the microcomputer detects the second operational state, i.e., detects that the pick-up unit 3 is at the clamp release position while the tray 1 is between the open stop position and the close stop position. Then, to recover the third operational state from the second operational state, the microcomputer controls the drive motor 5 to rotate the crank arm 7 clockwise. When the first through the third microswitches 94, 95 and 96 become the ON state, the OFF state and the ON state, respectively, the microcomputer determines that the third operational state is realized and finishes the recovery operation.

For example, in the case where the power is turned off in the sixth operational state and thereafter turned on again, the first through the third microswitches 94, 95 and 96 are in the OFF state, the ON state and the OFF state, respectively. Based on such ON/OFF information, the microcomputer detects the sixth operational state, i.e., detects that the pick-up unit 3 is at the clamp position while the tray 1 is between the open stop position and the close stop position. Then, to recover the third operational state from the sixth operational state, the microcomputer controls the drive motor 5 to rotate the crank arm 7 counterclockwise. When the first through the third microswitches 94, 95 and 96 become the ON state, the OFF state and the ON state, respectively, as described above, the microcomputer determines that the third operational state is realized and finishes the recovery operation.

In the foregoing embodiment, in FIG. 1, the rotational position of +θ from the rotation reference position S0 of the crank arm 7 is set as the open stop position for exchanging discs while not playing a disc, whereas the rotational position of −θ is set as the open stop position for mounting or exchanging discs while playing a disc. However, the rotational position of +θ may be set as the open stop position for mounting or exchanging discs while playing a disc, whereas the rotational position of −θ may be set as the open stop position for exchanging discs while not playing a disc.

In the disc changer of this embodiment, even when the crank arm 7 is rotated at a constant speed to move the tray 1, the distal end 71a of the arm portion 71 moves smoothly along the guide groove 100 so that the tray 1 moves while continuously changing the speed. Therefore; the smooth movement of the tray 1 is realized. Further, since the speed of the movement is sufficiently reduced when the tray 1 comes close to the stop position, the shock or the operational noise upon stopping can be reduced even when a member for mechanically stopping the movement of the tray 1, such as a stopper, is provided. Also from such a point, the movement feeling can be enhanced.

Figure 30:
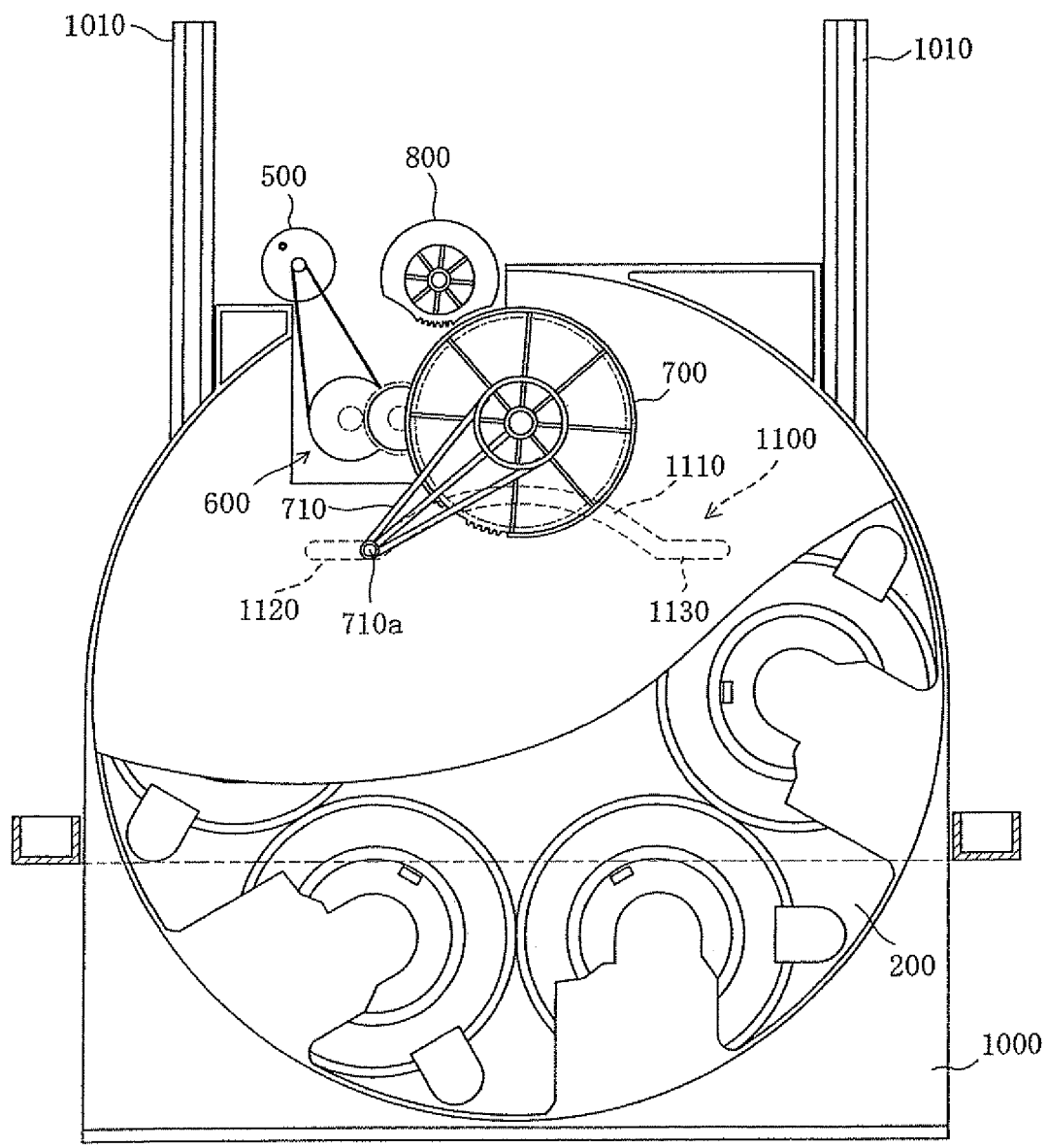
FIG. 30 shows the state in which the tray is pulled out from the housing by rotating the crank arm from the state shown in FIG. 29.

As is clear from the comparison between FIGS. 11 and 30, in the conventional guide groove 1100, the boundary between the intermediate curve 1110 and each of the left and the right straight ends 1120 and 1130 is discontinuous, so that the crank arm 700 cannot be rotated to the angle of +θ from the rotation reference position. However, in the disc changer of this embodiment, gentle curves 120 and 130 are formed at opposite ends of the intermediate curve 110 of the guide groove 100 to eliminate such a discontinuous boundary. Therefore, the rotation range of the crank arm 700 can be made larger than that of the conventional device.

Specifically, as shown in FIG. 11, the tray 1 can be opened to a position at which the disc mount portion 20 of the roulette table 2 is completely exposed. However, as shown in FIG. 30, the conventional tray can be opened merely to a position at which the disc mount portion 20 is exposed partially, not completely. Therefore, in the disc changer of the present invention, the pull-out amount of the tray can be made larger than that in the conventional device. Conversely, in the case where the tray 1 is to be pulled out from the device by the same amount, the frank arm 7 of the disc changer of the present invention can be made smaller than that of the conventional device, which is advantageous for the size reduction of the device.

Further, since the states of the tray 1 and the pick-up unit 3 can be detected by the three ribs formed at the lower portion of the crank arm 7 and three microswitches formed correspondingly to the ribs, the detection can be performed easily and inexpensively.

Unlike this embodiment, it may be considered to provide totally four microswitches, i.e., two microswitches for detecting the tray 1 at the open stop position and the close stop position and two microswitches for detecting the pick-up unit 3 at the clamp position and non-clamping position. In this embodiment, however, the detection can be performed by using only three microswitches 94-96, so that the number of switches can be minimized.

In the foregoing embodiment, the length of the arm portion 71 and the guide groove 100 can be determined based on the amount of movement of the tray 1 and the angular range in which the crank arm 7 rotates and can be varied appropriately in accordance with the specification. Further, as to the ON/OFF states of the first through the third microswitches 94-96, it is only necessary that the respective ON/OFF states in the first through the seventh operational states differ from each other. Based on such ON/OFF states, the positional relationship between the first through the third microswitches 94-96 and the first through the third ribs 74-76 can be determined. Further, although the cylindrical cam 8 is used in the above embodiment, a plate cam may be used instead of the cylindrical cam 8.

The invention claimed is:

1. A disc changer comprising: a tray for carrying a plurality of discs mounted thereto, the tray being arranged in a housing movably back and forth into and out of the housing;
   a reproducer arranged at a predetermined position in the housing to be displaceable up and down for reproducing information recorded on a disc while clamping the disc on the tray;
   a driving source for generating a driving force for performing the in-out movement of the tray and the displacement of the reproducer; and
   a driving force transmission for transmitting the driving force generated at the driving source to the tray and to the reproducer while switching between the tray and the reproducer, the transmission comprising a guide groove formed at a lower surface of the tray to extend right and left, a cam for displacing the reproducer up and down to shift the reproducer between a disc clamp position and a clamp release position, and a crank arm arranged below the tray in the housing, the crank arm including a disc-like rotation portion which is rotatable by the driving force of the driving source, an arm portion projecting radially outward from an outer circumference of the rotation portion and having a distal end slidably engaging the guide groove, and a connection portion formed at part of the outer circumference of the rotation portion for connection to the cam to transmit a rotational force of the rotation portion to the cam when the distal end of the arm portion moves through an intermediate portion of the guide groove;
   wherein the guide groove has a bow shape comprising an arcuate intermediate curve generally conforming to an arcuate path along which the distal end of the arm portion moves due to the rotation of the crank arm, and left and right end curves extending from opposite ends of the intermediate curve and curved opposite to the intermediate curve;
   wherein the cam is cylindrical and has a circumferential surface part of which is formed with a cam groove inclined with respect to a vertical direction and another part of which is formed with teeth; and
   wherein the connection portion of the crank arm comprises teeth formed at a circumferential surface of the rotation portion at a position which faces the teeth of the cylindrical cam to mesh with the teeth during when the distal end of the arm portion moves through the intermediate curve of the guide groove.

2. The disc changer according to claim 1, wherein the rotational force of the crank arm is transmitted to the tray during when the distal end of the arm portion moves through the left end curve or the right end curve of the guide groove, whereas the rotational force of the crank arm is transmitted to the reproducer via the cam during when the distal end of the arm portion moves through the intermediate curve of the guide groove.

3. The disc changer according to claim 2, wherein the tray pulled out of the housing can be kept at an open stop position when the distal end of the arm portion of the crank arm in a process of moving from the left end curve or right end curve toward the intermediate curve of the guide groove reaches a predetermined position in the left end curve or the right end curve.

4. The disc changer according to claim 3, wherein the predetermined position is adjacent a boundary between the right end curve or the left end curve and the intermediate curve of the guide groove.

5. The disc changer according to claim 1, wherein a detector for detecting operational states of the tray and the reproducer is provided under the rotation portion of the crank arm.

6. The disc changer according to claim 5, wherein the detector detects the operational states of the tray and the reproducer by detecting a position of the distal end of the arm portion of the crank arm in the guide groove.

7. The disc changer according to claim 6, wherein the detector detects that the distal end of the arm portion of the crank arm is positioned in the intermediate curve of the guide groove, in the left end curve of the guide groove, in the right end curve of the guide groove, at the position in the left end curve of the guide groove which corresponds to the open stop position of the tray, and at the position in the right end curve of the guide groove which corresponds to the open stop position of the tray.

8. The disc changer according to claim 6, wherein the detector comprises a plurality of ribs respectively formed on a plurality of concentric tracks on a lower surface of the rotation portion of the crank arm, a plurality of switches provided below the rotation portion of the crank arm at positions which face the respective tracks, and a determiner for determining the position of the distal end of the arm portion of the crank arm in the guide groove based on information as to switching operation of the switches performed by the ribs in accordance with the rotation of the rotation portion of the crank arm.

9. The disc changer according to claim 8, wherein each of the ribs has opposite ends each of which is formed with a downward slope.

10. The disc changer according to claim 8, wherein the determiner determines the position of the distal end of the arm portion of the crank arm in the guide groove based on combination of ON/OFF information of the plurality of switches.

11. A disc changer comprising: a tray for carrying a plurality of discs mounted thereto, the tray being arranged in a housing movably back and forth into and out of the housing;
a reproducer arranged at a predetermined position in the housing to be displaceable up and down for reproducing information recorded on a disc while clamping the disc on the tray;
a driving source for generating a driving force for performing the in-out movement of the tray and the displacement of the reproducer; and
a driving force transmission for transmitting the driving force generated at the driving source to the tray and to the reproducer while switching between the tray and the reproducer, the transmission comprising a guide groove formed at a lower surface of the tray to extend right and left, a cam for displacing the reproducer up and down to shift the reproducer between a disc clamp position and a clamp release position, and a crank arm arranged below the tray in the housing, the crank arm including a disc-like rotation portion which is rotatable by the driving force of the driving source, an arm portion projecting radially outward from an outer circumference of the rotation portion and having a distal end slidably engaging the guide groove, and a connection portion which is formed at part of the outer circumference of the rotation portion for connection to the cam to transmit a rotational force of the rotation portion to the cam when the distal end of the arm portion moves through an intermediate portion of the guide groove;
wherein a detector is provided under the rotation portion of the crank arm for detecting, at least, a state in which the tray is pulled out from the housing, a state in which the tray is accommodated in the housing, a state in which the reproducer clamps a disc, and a state in which the reproducer releases a disc.

12. The disc changer according to claim 11, wherein the detector comprises a plurality of ribs respectively formed on a plurality concentric tracks on a lower surface of the rotation portion of the crank arm, a plurality of switches provided under the rotation portion of the crank arm at positions which face the respective tracks, and a determiner for determining the operational state of the tray and the reproducer based on information as to switching operation of the switches performed by the ribs in accordance with the rotation of the rotation portion of the crank arm.

13. The disc changer according to claim 12, wherein each of the ribs has opposite ends each of which is formed with a downward slope.

14. The disc changer according to claim 12, wherein the determiner determines the operational state of the tray and the reproducer based on combination of ON/OFF information of the plurality of switches.

15. The disc changer according to claim 11, wherein the detector comprises three ribs respectively formed on a plurality concentric tracks on a lower surface of the rotation portion of the crank arm, thee switches provided under the rotation portion of the crank arm at positions which face the respective tracks, and a determiner for determining the operational states of the tray and the reproducer based on information as to switching operation of the switches performed by the ribs in accordance with the rotation of the rotation portion of the crank arm, said operational states including a state in which the tray is pulled out from the housing with the reproducer not clamping a disc, a state in which the tray is moving with the reproducer not clamping a disc, a state in which the tray is accommodated in the housing with the reproducer not clamping a disc, a state in which the tray is accommodated in the housing with the reproducer moving up or down, a state in which the tray is accommodated in the housing with the reproducer clamping a disc, a state in which the tray is moving with the reproducer clamping a disc, and a state in which the tray is pulled out of the housing with the reproducer clamping a disc.

16. A disc changer comprising: a tray for carrying a plurality of discs mounted thereto, the tray being arranged in a housing movably back and forth into and out of the housing;
a reproducer arranged at a predetermined position in the housing to be displaceable up and down for reproducing information recorded on a disc while clamping the disc on the tray;
a driving source for generating a driving force for performing the in-out movement of the tray and the displacement of the reproducer; and
a driving force transmission for transmitting the driving force generated at the driving source to the tray and to the reproducer while switching between the tray and the reproducer, the transmission comprising a guide groove formed at a lower surface of the tray to extend right and left, a cam for displacing the reproducer up and down to shift the reproducer between a disc clamp position and a clamp release position, and a crank arm arranged below the tray in the housing, the crank arm including a disc-like rotation portion which is rotatable by the driving force of the driving source, an arm portion projecting radially outward from an outer circumference of the rotation portion and having a distal end slidably engaging the guide groove, and a connection portion formed at part of the outer circumference of the rotation portion for connection to the cam to transmit a rotational force of the rotation portion to the cam when the distal end of the arm portion moves through an intermediate portion of the guide groove;
wherein the guide groove has a bow shape comprising an arcuate intermediate curve generally conforming to an arcuate path along which the distal end of the arm portion moves due to the rotation of the crank arm, and left and right end curves extending from opposite ends of the intermediate curve and curved opposite to the intermediate curve; and
wherein a detector for detecting operational states of the tray and the reproducer is provided under the rotation portion of the crank arm.

* * * * *